United States Patent
Hancock et al.

(10) Patent No.: US 10,292,531 B1
(45) Date of Patent: May 21, 2019

(54) COOKING DEVICE HAVING HEAT SOURCES IN A STACKED ARRANGEMENT

(71) Applicant: Innovative Product Solutions, LLC, Ogden, UT (US)

(72) Inventors: Jeffrey D. Hancock, Uintah, UT (US); Christopher N. Schenck, Uintah, UT (US)

(73) Assignee: Innovative Product Solutions, LLC, Ogden, UT (US)

( * ) Notice: Subject to any disclaimer, the term of this patent is extended or adjusted under 35 U.S.C. 154(b) by 0 days.

(21) Appl. No.: 16/001,921

(22) Filed: Jun. 6, 2018

(51) Int. Cl.
*F24C 3/14* (2006.01)
*A47J 37/07* (2006.01)
*A23B 4/052* (2006.01)

(52) U.S. Cl.
CPC .......... *A47J 37/0713* (2013.01); *A23B 4/052* (2013.01); *A47J 37/0786* (2013.01)

(58) Field of Classification Search
CPC ...................................................... F24B 1/207
See application file for complete search history.

(56) References Cited

U.S. PATENT DOCUMENTS

| | | | |
|---|---|---|---|
| 2,353,278 A | 7/1944 | Arthur et al. | |
| 2,894,448 A | 7/1959 | Henderson | |
| 2,902,026 A | 9/1959 | Hathorn, Jr. | |
| 2,909,170 A | 10/1959 | Hathorn, Jr. | |
| 3,002,444 A | 10/1961 | Hoebing | |
| 3,296,955 A | 1/1967 | Schaniel | |
| 3,623,422 A | 11/1971 | Marshall | |
| 3,776,127 A * | 12/1973 | Muse | A47J 37/00 99/352 |
| 3,938,494 A | 2/1976 | Clark | |
| 4,471,751 A | 9/1984 | Hottenroth | |
| 4,495,860 A | 1/1985 | Hitch | |
| 4,554,864 A | 11/1985 | Smith et al. | |
| 4,700,618 A | 10/1987 | Cox, Jr. | |

(Continued)

OTHER PUBLICATIONS

Exclusive Review—American Muscle Grill—Mutli Fuel—Gas, Charcoal, Wood, or Pellet—BBQGuys.com; Published on Dec. 8, 2015; BBQGuys.com; available at: https://www.youtube.com/watch?v=wyQ5UVv0Tq4.

(Continued)

*Primary Examiner* — Nathaniel Herzfeld
(74) *Attorney, Agent, or Firm* — Maschoff Brennan

(57) ABSTRACT

A cooking device includes a housing assembly, a cooking structure, a first heat source, and a second heat source. The housing assembly defines a single, integrated cooking volume that includes a central portion disposed between a first portion and a second portion. The cooking structure has a cooking surface arranged for placement of a foodstuff and is disposed between the central portion and the first portion. The first heat source is positioned a first distance from the cooking structure in a first direction. The first heat source is disposed in the central portion and arranged to heat the cooking structure via convection. The second heat source is disposed a second distance, which is greater than the first distance, from the cooking structure in the first direction. The second heat source is disposed in the second portion and is arranged to provide thermal energy indirectly to the first portion and the central portion.

17 Claims, 12 Drawing Sheets

(56) References Cited

U.S. PATENT DOCUMENTS

| | | | |
|---|---|---|---|
| 4,823,684 A * | 4/1989 | Traeger | A47J 37/0704 126/10 |
| 5,031,602 A | 7/1991 | Vick | |
| 5,528,984 A | 6/1996 | Saurwein | |
| 6,000,389 A | 12/1999 | Alpert | |
| 6,102,028 A | 8/2000 | Schlosser | |
| 6,173,644 B1 | 1/2001 | Krall | |
| 6,223,737 B1 * | 5/2001 | Buckner | F23B 1/38 110/108 |
| 6,257,130 B1 | 7/2001 | Schlosser | |
| 6,595,197 B1 | 7/2003 | Ganard | |
| 6,640,800 B1 | 11/2003 | Hodgson | |
| 6,821,538 B2 | 11/2004 | Axelrod | |
| 7,270,122 B2 | 9/2007 | Jones | |
| 7,469,630 B1 | 12/2008 | Ray | |
| 7,793,649 B2 | 9/2010 | Barkhouse et al. | |
| 8,381,712 B1 | 2/2013 | Simms, II | |
| 8,800,542 B1 | 8/2014 | Kennington | |
| 9,316,401 B1 * | 4/2016 | Guste | F24C 15/18 |
| 9,814,354 B2 | 11/2017 | McAdams | |
| 2004/0237801 A1 | 12/2004 | Starkey | |
| 2005/0039612 A1 | 2/2005 | Denny | |
| 2008/0066733 A1 | 3/2008 | Wahl et al. | |
| 2008/0121221 A1 | 5/2008 | Wang et al. | |
| 2010/0024798 A1 | 2/2010 | Sampson | |
| 2010/0218754 A1 * | 9/2010 | Kuntz | A47J 37/0786 126/25 R |
| 2011/0094494 A1 | 4/2011 | Malumyan | |
| 2011/0120442 A1 | 5/2011 | Duncan | |
| 2013/0298894 A1 * | 11/2013 | Kleinsasser | A47J 37/0704 126/25 R |
| 2014/0290497 A1 | 10/2014 | Blomberg | |
| 2014/0326232 A1 | 11/2014 | Traeger | |
| 2015/0245740 A1 | 9/2015 | Garcia | |
| 2015/0265099 A1 | 9/2015 | Coffee | |
| 2016/0255999 A1 * | 9/2016 | McAdams | A47J 37/0763 |
| 2016/0327263 A1 * | 11/2016 | Traeger | A47J 37/0704 |
| 2016/0374509 A1 * | 12/2016 | Blomberg | A47J 37/0704 99/331 |
| 2017/0164783 A1 * | 6/2017 | Sauerwein | A47J 37/0709 |

OTHER PUBLICATIONS

Rick Bayless Explains the Kalamazoo Hybrid Grill; Published on Dec. 21, 2016; SurLaTableCorp; available at: https://www.youtube.com/watch?v=eT-IBAYLHZY.

Cabela's 7-in-1 Smoker: Features; Published on Mar. 24, 2015; Masterbuilt; available at: https://www.youtube.com/watch?v=EmoxdiarVw.

Pit Boss Memphis Ultimate; Published on Jan. 28, 2018; Pit Boss Grills; available at: https://www.youtube.com/watch?v=HGm7Q6HhKyM.

Five Reasons to Buy a Vision Grill; Published on May 24, 2013; videosolutions; available at: https://www.youtube.com/watch?v=mkO19Eahp7E.

* cited by examiner

COOKING DEVICE HAVING HEAT SOURCES IN A STACKED ARRANGEMENT

BACKGROUND OF THE INVENTION

Field of the Invention

The present invention generally relates to cooking devices, in particular, some embodiments of the present disclosure relate to cooking devices having heat sources in a stacked arrangement.

Description of Related Art

Many different types of cooking devices are well known and used for a variety of different purposes. For example, some cooking devices may be implemented to cook foodstuffs in an outdoor environment such as a park, a yard, while camping, etc. The outdoor cooking devices generally combust a particular type of fuel to generate thermal energy, which is used to cook the foodstuffs. Examples of the types of fuel include propane gas, natural gas, charcoal, wood, etc. Most cooking devices are configured to burn a single type of fuel. For instance, charcoal grills are generally constructed with areas for charcoal briquettes and provide an access to remove the briquettes following use.

Additionally, some cooking devices may be configured for multiple types of fuels. However, the dual-fuel or multi-fuel type cooking devices are often comprised of single-fuel type cooking devices manufactured into a single device. For instance, an example of a duel-fuel cooking device may include a gas grill that is positioned next to a charcoal grill and manufactured into a single device. Such configurations are generally large compared to single-fuel type cooking devices and do not improve the functionality of the cooking device. Instead, these merely provide a fuel option. Moreover, these duel-fuel type cooking devices often include multiple separate cooking volumes with multiple separate cooking surfaces. Accordingly, these duel-fuel type cooking devices are not well suited for a cooking operation involving multiple fuel types or involve the movement of foodstuffs between the separate cooking volumes during use.

The subject matter claimed herein is not limited to embodiments that solve any disadvantages or that operate only in environments such as those described. Rather, this background is only provided to illustrate one example technology area where some embodiments described herein may be practiced.

BRIEF SUMMARY OF EMBODIMENTS OF THE INVENTION

A need therefore exists for a cooking device that eliminates or diminishes the disadvantages and problems described above.

One aspect of an embodiment includes a cooking device that includes a housing assembly, a cooking structure, a first heat source, a second heat source, a baffle, a vent conduit, a wood pellet reservoir, and a drip tray. The housing assembly may define a single integrated cooking volume. The cooking volume may include multiple portions that may include a first portion, a second portion, and a central portion. The central portion may be disposed between the first portion and the second portion. The cooking structure may have a cooking surface that is arranged for placement of a foodstuff. The cooking surface may be disposed at a boundary between the central portion and the first portion. The first heat source may be disposed in one of the portions of the volume such as the central portion and the second heat source may be disposed in one of the portions of the volume such as the second portion of the cooking volume. The first heat source may be positioned a first distance from the cooking structure in a first direction. The first heat source may be disposed in the central portion of the cooking volume and may be arranged to heat the cooking structure via convection such that the cooking structure provides thermal energy via conduction to a foodstuff placed on the cooking surface and to heat the first portion of the cooking volume via convection. The first heat source may be configured to combust a first fuel type and may be implemented for a direct heating process. The second heat source may be configured to combust a second fuel type and may be implemented for an indirect heating process. The first heat source may include a gas heat source such as a low-pressure gas grill that may be controllable via a valve. The second heat source may be disposed a second distance from the cooking structure in the first direction. In detail, at least a portion of the first heat source may be separated from the second heat source in only the first direction. The second distance may be greater than the first distance. The second heat source may be disposed in the second portion of the cooking volume and may be arranged to provide thermal energy indirectly to the first portion and the central portion of the cooking volume. The second heat source may be positioned in a middle part of the cooking volume. The first heat source may be configurable to bring the first portion of the cooking volume to a particular temperature at a first heat rate that is greater than a second heat rate at which the second heat source is capable of heating the first portion of the cooking volume to the particular temperature. The second heat source may include a wood pellet burner that may be fed via a feed subsystem such as an automatic pellet feed subsystem. The first heat source and the second heat source may be usable independently and usable concurrently such that the housing assembly may be heated by the first heat source, the second heat source, or a combination of the first heat source and the second heat source. The baffle may be disposed between the first heat source and the second heat source. The baffle may be configured to direct at least a portion of the thermal energy produced by the second heat source to outer portions of the cooking volume adjacent the housing assembly and to the first portion of the cooking volume. The housing assembly may define one or more openings such as a vent opening that connects the vent conduit to the first portion of the cooking volume. The vent conduit may connect the first portion of the cooking volume to an ambient environment. The wood pellet reservoir may be mechanically coupled to the housing assembly. The wood pellet burner may include a cylindrical structure configured to receive wood pellets from the wood pellet reservoir via an auger. The auger may be positioned at a lower portion of the wood pellet reservoir. The drip tray may be configured to collect fluids dripping from the foodstuffs during operation.

Advantageously, the heat sources are both positioned in a single, integrated volume defined by the housing assembly. Inclusion of the heat sources may reduce an overall footprint of the cooking device relative to other cooking devices that define multiple, separate cooking volumes that are arranged side-by-side or vertically.

Another aspect of an embodiment includes a cooking device having a stacked arrangement. The cooking device may include a housing assembly, a cooking structure, a gas heat source, a wood pellet heat source, a wood pellet reservoir, and a lower door. The housing assembly may define a single volume that may include multiple portions such as a lower portion and a central portion. The central portion may be above the lower portion. The lower portion of the volume may be defined by an arced lower portion of the housing assembly and may include a substantially rectangular cross-section at an upper end that substantially corresponds to a footprint of the cooking structure. The central portion may include a substantially rectangular volume that may extend from the lower portion. The volume may further comprise an upper portion that may include an arc boundary defined at least partially by an upper lid that may be rotatable connected to the housing assembly. The cooking structure may have a cooking surface. The cooking surface may be configured for placement of foodstuffs. The cooking structure may be disposed in the central portion of the volume. The gas heat source may be positioned in the lower portion of the volume and may be disposed a first distance below the cooking structure. The gas heat source may be arranged relative to the cooking structure such that the gas heat source is below a portion of the cooking structure or substantially all of the cooking structure. The gas heat source may be controllable via a valve, which may be a manual valve or an automated valve. The gas heat source may be configurable to bring the upper portion of the volume to a particular temperature at a first rate. The first rate may be greater than a second rate at which the wood pellet heat source is capable of heating the upper portion of the volume to the particular temperature. The wood pellet heat source may be positioned below the gas heat source and in the lower portion of the volume. The wood pellet reservoir may be mechanically coupled to the housing assembly. The wood pellet heat source may be fed via a feed subsystem of an automatic pellet feed subsystem. The wood pellet heat source may include a cylindrical structure or another shaped structure configured to receive wood pellets from the wood pellet reservoir via an auger. The auger may be positioned at a lower portion of the wood pellet reservoir. The gas heat source and the wood pellet heat source may be usable independently and usable concurrently. The lower door may provide access to the lower portion of the volume. The lower door may be rotatably coupled to the housing assembly at a lower housing end. The lower door may be configurable in an open position in which the wood pellet heat source is accessible. The lower door may be configurable in a closed position in which the volume is substantially sealed relative to an ambient environment.

Advantageously, the cooking device that includes the stacked arrangement includes a disposition of the first heat source, which may be better suited for high-heat cooking processes, close to a cooking structure. The stacked arrangement further includes a disposition of the second heat source, which may be better suited for low-heat cooking processes, farther from the cooking structure. Accordingly, the cooking device may enable high-heat operations by the first heat source, low-heat operations by the second heat source, as well as cooking operations that involve both heat sources.

Yet another aspect includes a cooking device that may include a housing assembly, a first heat source, a second heat source, and feed subsystem such as a pellet feed subsystem. The housing assembly may define a single integrated cooking volume that may include multiple portions such as a rectangular cross section that may be arranged to receive a cooking structure, a lower arched portion below the rectangular cross section, and an upper arched portion above the rectangular cross section. The first heat source may be positioned in the housing assembly. The positioning of the first heat source may enable particular heating functions such as that of an emission of a first thermal energy. The first thermal energy may be emitted and distributed across to most or substantially all of the rectangular cross section. The first heat source may be arranged to heat a cooking structure received in the housing assembly via direct convection and to heat the volume defined by the housing assembly. The first heat source may include a gas heat source such as a low-pressure gas grill that may be controllable via one or more valves. The second heat source disposed in the housing assembly below the first heat source, the second heat source being arranged to provide a second thermal energy to the volume defined by the housing assembly. The second heat source may be separated from the first heat source by a first distance in a first direction and may be positioned relative to an interior portion of the first heat source. The first heat source and the second heat source are usable independently and usable concurrently. The second heat source may include a low thermal output heat source and the first heat source includes a high thermal output heat source relative to the low thermal output heat source. The pellet feed subsystem may include a wood pellet reservoir and an auger. The wood pellet reservoir may be mechanically coupled to the housing assembly. The auger may be positioned at a lower portion of the wood pellet reservoir. The second heat source includes a wood pellet burner that may have a structure of a particular geometry. In detail, the wood pellet burner may include a cylindrical structure. The wood pellet burner may be configured to receive wood pellets from the wood pellet reservoir via the auger.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limit its scope. The invention will be described and explained with additional specificity and detail through the use of the accompanying drawings in which.

DETAILED DESCRIPTION OF SOME EXEMPLARY EMBODIMENTS

The present invention is directed towards cooking devices that include multiple heat sources in a stacked arrangement. The principles of the present invention, however, are not limited to cooking devices. It will be understood that, in light of the present disclosure, the components and arrangements disclosed herein can be successfully used in connection with other types of cooking devices.

Additionally, to assist in the description of the cooking devices, words such as top, bottom, front, rear, right, and left may be used to describe the accompanying figures. It will be appreciated that the cooking devices can be disposed in other positions, used in a variety of situations and may perform a number of different functions. In addition, the drawings may be to scale and may illustrate various configurations, arrangements, aspects, and features of the cooking devices. It will be appreciated, however, that the cooking devices may have other suitable shapes, sizes, configurations, and arrangements depending, for example, upon the intended use of the cooking devices. Further, the cooking devices may include any suitable number or combination of aspects, features and the like. A detailed description of exemplary embodiments of the cooking devices now follows.

Figure 1A:
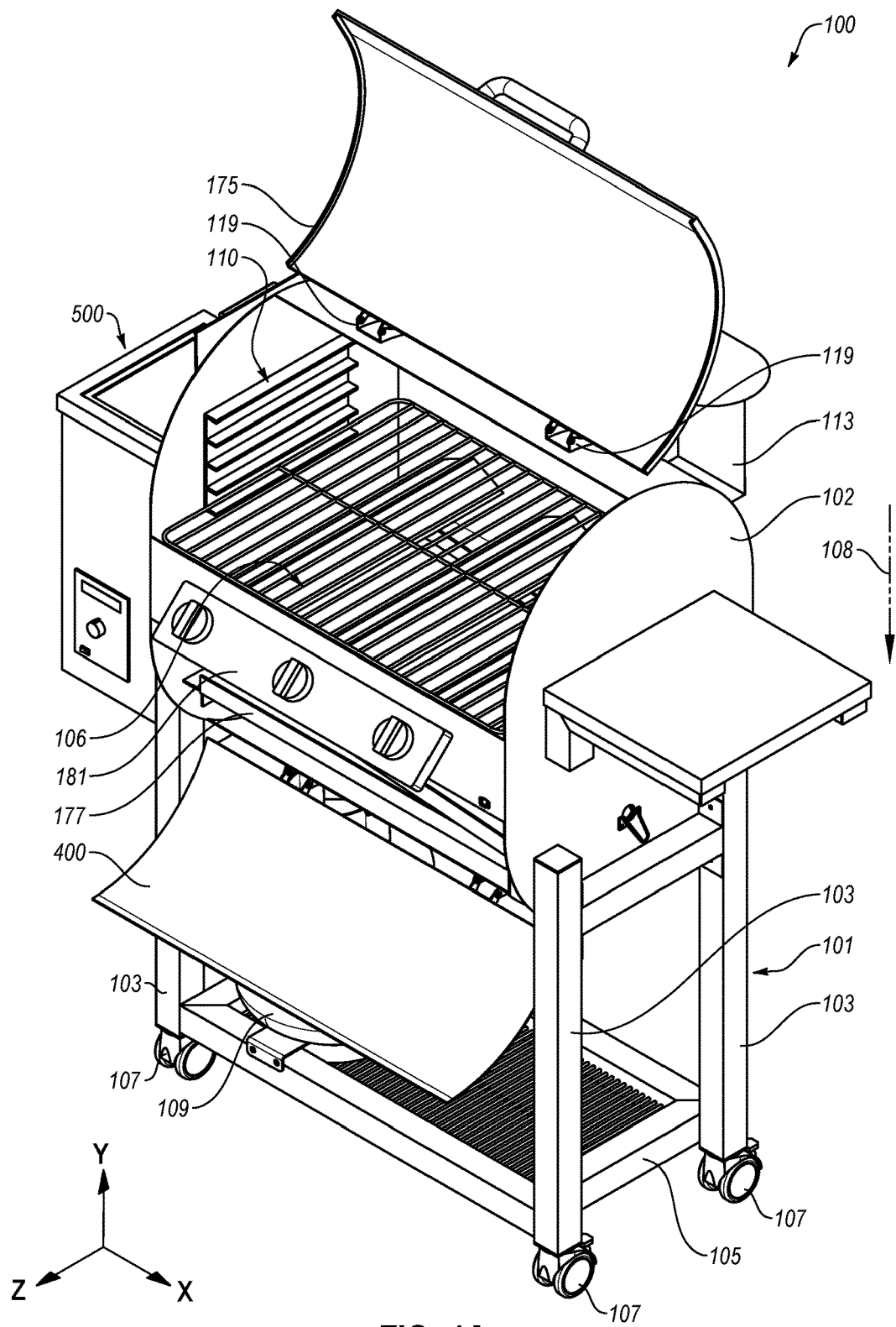
FIG. 1A illustrates an exemplary cooking device.
Figure 1B:
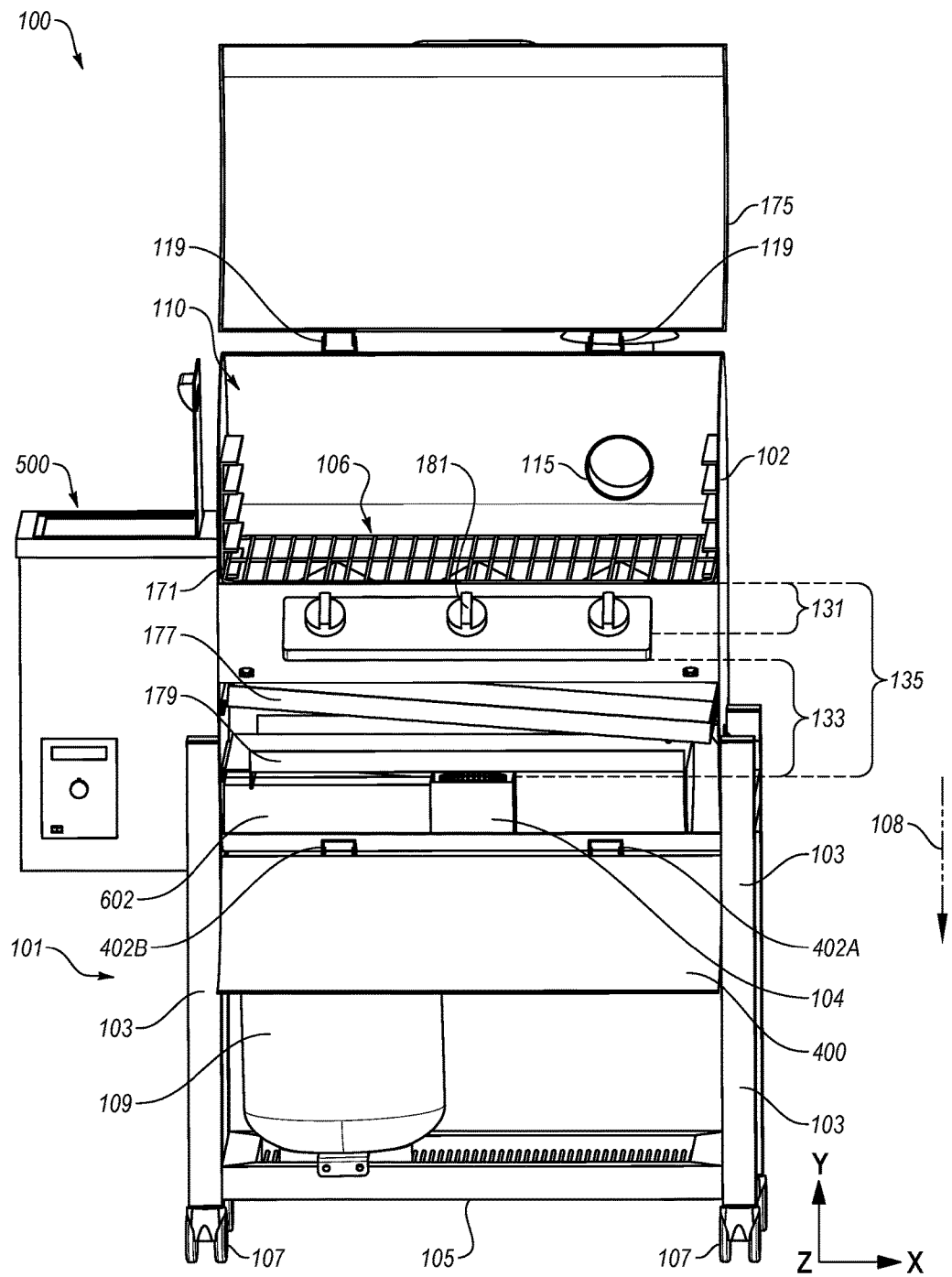
FIG. 1B is another view of the cooking device of FIG. 1A.

FIGS. 1A and 1B illustrate an exemplary cooking device 100. FIG. 1A is an upper perspective view of the cooking device 100. FIG. 1B is a front view of the cooking device 100. The cooking device 100 includes multiple heat sources 104 and 106 that are arranged in a stacked arrangement in which heat sources 104 and 106 are separated from one another in substantially a single direction. For example, the heat sources 104 and 106 are arranged in the cooking device 100 such that a first heat source 106 is separated from a second heat source 104 by a particular distance in a first direction 108. The first direction 108 is substantially parallel to the y-direction in the arbitrarily defined coordinate system of FIGS. 1A and 1B.

The stacked arrangement includes a disposition of the first heat source 106, which may be better suited for high-heat cooking processes, close to a cooking structure 171 that is configured for foodstuff placement. The stacked arrangement further includes a disposition of the second heat source 104, which may be better suited for low-heat cooking processes, farther from the cooking structure 171. Generally, the first heat source 106 may be implemented for direct heating of the foodstuffs. Direct heating as used in the present disclosure may indicate that the thermal energy emitted or generated from the first heat source 106 heats a bottom surface (e.g., a surface placed on the cooking structure 171) of the foodstuff. Additionally, direct heating may indicate that the heat emitted or generated from the heat source 106 is transferred to the cooking structure 171, which is then transferred to the foodstuffs via conduction. Direct heating generally includes cooking processes that are short in duration when contrasted with indirect heating. For instance, direct heating process may have a duration of a few minutes (e.g., fewer than about 5 minutes in some embodiments). Direct heating is contrasted from indirect heating. As used in the present disclosure, indirect heating indicates that a volume or an environment around the foodstuffs may be heated. However, the distance between the heat source (e.g., 104) and the foodstuffs is sufficient for the thermal energy to be diffused or substantially diffused to an environment between the foodstuffs and the heat source. Indirect heating generally includes cooking processes that are long in duration when contrasted with direct heating. For instance, indirect heating process may have a duration of a several minutes to multiple hours (e.g., greater than about 7 minutes to about 12 hours, etc. in some embodiments).

Accordingly, the cooking device 100 may enable high-heat operations and/or direct heating by the first heat source 106, low-heat operations and/or indirect heating by the second heat source 104, as well as cooking operations that involve both heat sources 104 and 106. These cooking operations that involve both heat sources 104 and 106 include some direct heating and some indirect heating. Due to inclusion of both heat sources 104 and 106, such cooking operations may be performed with minimal movement of the foodstuffs. Some additional details of the cooking operations involving both of the heat sources 104 and 106 are described elsewhere in the present disclosure.

Additionally, the heat sources 104 and 106 are both positioned in a single, integrated volume 110 that is defined by a housing assembly 102 of the cooking device 100. Inclusion of the heat sources 106 and 104 in the volume 110 in the stacked arrangement reduces an overall footprint of the cooking device 100 relative to other cooking devices that define multiple, separate cooking volumes that are arranged side-by-side or vertically. For instance, a conventional cooking device may include a gas grill in a first cooking volume that is positioned to one side of a second cooking volume that implements a charcoal grill. Such side-by-side arrangement may result in an increased footprint and limit concurrent operations of this conventional cooking device. Furthermore, the heat sources 106 and 104 being positioned in the volume 110 may reduce materials used in construction of the cooking device 100. Thus, the cooking device 100 and the stacked arrangement of the heat sources 104 and 106 in the volume 110 therein may enable additional cooking processes while including an efficient footprint relative to other cooking devices.

The cooking device 100 may include a base structure 101 or another support structure to which the housing assembly 102 is mechanically coupled. For instance, the housing assembly 102 may be welded to or otherwise mechanically coupled to an upper portion of the base structure 101. The base structure 101 may be configured to retain the housing assembly 102 above a surface such as a floor or the ground. The base structure 101 of FIGS. 1A and 1B may include vertical supports 103 that connect to a lower platform 105 and to the housing assembly 102. Casters 107 may be positioned at lower ends of the vertical supports 103, which may enable movement of the cooking device 100. The lower platform 105 may be configured to support a gas tank 109 relative to the housing assembly 102. For instance, in embodiments in which the first heat source 106 includes a gas grill, the gas tank 109 may be coupled to the gas grill to provide gas during operation.

Although the base structure 101 of FIGS. 1A and 1B includes four of the vertical supports 103, four of the casters 107, and the lower platform 105, in other embodiments, the base structure 101 may include a cabinet below the housing assembly 102, fewer than two casters 107, multiple lower platforms 105, and other variations. In addition, in other embodiments, the cooking device 100 may not include the base structure 101. For instance, the cooking device 100 may be integrated into an outdoor kitchen or another structure that is not configured for movement. For instance, the housing assembly 102 and/or one or more other components of the cooking device 100 may be installed in a concrete or brick structure installed on a patio or a backyard of a user.

The cooking device 100 may include a feed subsystem 500. The feed subsystem 500 may temporarily store and feed fuel to the second heat source 104. For instance, the second heat source 104 may include a wood pellet burner. Accordingly, in these embodiments, the feed subsystem 500 may include a wood pellet feed subsystem that stores wood pellets and feeds the wood pellets to the second heat source 104 during at least some cooking operations. As used in the present disclosure, wood pellets may include any compressed biofuel, which may be used as a fuel source. The wood pellets may comprise biomass, and may particularly be comprised of wood that may emit heat and smoke during combustion.

The feed subsystem 500 may be mechanically coupled to the housing assembly 102 and may include portions that extend into a lower portion of the volume 110. For instance, the feed subsystem 500 may include an auger conduit 602 that extends into the volume 110 and to the second heat source 104.

The cooking device 100 may include a vent conduit 113 (FIG. 1A). The vent conduit 113 may be fluidly coupled to the volume 110 defined by the housing assembly 102 by a vent opening 115 (FIG. 1B). The vent opening 115 may be defined in a rear portion 117 of the housing assembly 102. The vent conduit 113 connects at least a portion of the volume 110 to an ambient environment. For instance, in some embodiments, the second heat source 104 may include a wood pellet burner. During operation, the vent conduit 113 may provide a path to vent smoke to the ambient environment surrounding the cooking device 100.

The housing assembly 102 may define the volume 110. The housing assembly 102 may include an upper lid 175 and a lower door 400. The upper lid 175 and the lower door 400 may make up portions of the housing assembly 102 when positioned in a closed position. In FIGS. 1A and 1B, the upper lid 175 and the lower door 400 are depicted in an open position. In the open position, internal surfaces of the housing assembly 102 and components (e.g., 171, 104, 106, 177, 179, etc.) may be accessed. For example, with the upper lid 175 in the open position, foodstuffs may be placed on and removed from the cooking structure 171. Additionally, with the lower door 400 in the open position, the second heat source 104 may be accessed to be cleaned or otherwise maintained.

The upper lid 175 may be rotatably coupled to a rear upper portion of the housing assembly 102 via upper hinges 119. The upper lid 175 may rotate about axels of the upper hinges 119 between the open position and a closed position. In the closed position, the upper lid 175 may enclose an upper portion of the housing assembly 102 and/or substantially seal the upper portion of the housing assembly 102 relative to the ambient environment.

Similarly, the lower door 400 may be rotatably coupled to a bottom portion of the housing assembly 102 via lower hinges 402A and 402B (generally, lower hinge 402 or lower hinges 402). The lower hinges 402 may rotatably connect the lower door 400 to the housing assembly 102. The lower door 400 may rotate about axels of the lower hinges 402 between the open position and a closed position. In the closed position, the upper lid 175 may enclose a lower portion of the housing assembly 102 and/or substantially seal the lower portion of the housing assembly 102 relative to the ambient environment.

As best depicted in FIG. 1B, in the cooking device 100, multiple components such as the first heat source 106, the second heat source 104, the cooking structure 171, a baffle 177, and a drip tray 179, or some combination thereof may be positioned in the volume 110. As introduced above, the heat sources 104 and 106 may be positioned in the stacked arrangement. For instance, the first heat source 106 may be separated from the cooking structure 171 by a first distance 131 (FIGS. 1B-2B) and the second heat source 104 may be separated from the cooking structure 171 by a second distance 135 (FIGS. 1B-2B). The second distance 135 is greater than the first distance 131 such that the first heat source 106 is closer to the cooking structure 171.

The first heat source 106 may include a first type of heat source such as a gas burner (e.g., propane burner or natural gas burner) that may be used for high-heat (e.g., greater than about 350 degrees Fahrenheit (F)) and/or direct cooking processes. For instance, the first heat source 106 may include a high heat source relative to the second heat source 104. Thus, the first heat source 106 may be used for cooking processes such as directly heating (e.g., grilling, searing, blackening, etc.) foodstuffs placed on the cooking structure 171 or otherwise disposed in the volume 110.

The second heat source 104 may include a second type of heat source such as a wood pellet burner, which may be implemented for low-heat (e.g., lower than about 350 degrees F.) and/or indirect cooking processes. For instance, the second heat source 104 may be used for cooking processes such as indirectly heating (e.g., smoking, warming, slow cooking, etc.) foodstuffs placed on the cooking structure 171 or otherwise disposed in the volume 110.

The first heat source 106 and the second heat source 104 are usable independently. For instance, the first heat source 106 may be operated while the second heat source 104 is not operational and vice versa. In addition, the first heat source 106 and the second heat source 104 may be usable concurrently and/or in some combination during a cooking process. Use of the heat sources 104 and 106 together may reduce fuel use and reduce time involved in the cooking process when compared to a similar process performed by conventional cooking devices.

For instance, an example smoking process may involve heating the volume 110 to about 225 degrees F. or another suitable temperature. After the volume is about 225 degrees F., foodstuff may be placed on the cooking structure 171. The volume 110 may be maintained at about 225 degrees F. for several hours while the foodstuff cooks. During at least a portion of the several hours, smoke may be introduced and maintained in the volume 110. After several hours, the foodstuff may be finished by searing the foodstuff. The cooking device 100 may be used to implement this example smoking process. For instance, the first heat source 106 may be used to heat the volume 110 to the 225 degrees F. The first heat source 106 may include a gas grill, which may be capable of heating the volume 110 to a particular temperature at a higher rate than the second heat source 104. After the volume 110 is heated, the second heat source 104 may be implemented to provide smoke and a portion of heat used to maintain the temperature indirectly. The heat provided by the first heat source 106 may be reduced to supplement the heat supplied by the second heat source 104. Accordingly, the fuel used by the first heat source 106 and the second heat source 104 may be reduced. The second heat source 104 may be turned off when the smoke is no longer introduced to the volume 110 and the first heat source 106 may be increased to maintain the temperature for the remainder of the several hours. After the several hours, the heat supplied directly by the first heat source 106 may be increased to finish the foodstuffs. During the cooking process implemented by the cooking device 100, the foodstuff may remain on the cooking structure 171. The user may simply adjust the heat sources 104 and 106 and accordingly lower the heat provided to the volume 110 by the heat sources 104 and 106. Additionally, during the cooking process the upper lid 175 and the lower door 400 may be maintained in the closed positions. Consequently, thermal losses to the environment may be reduced or prevented. Thus, the cooking process implemented by the cooking device 100 may reduce or eliminate a need to move the foodstuffs from one cooking device to another and to wait long periods of time while a low-temperature heat source is used to heat the volume relative to conventional cooking devices.

The baffle 177 and the drip tray 179 may be positioned between the heat sources 104 and 106. For instance, the baffle 177 may be disposed between the first heat source 106 and the second heat source 104. The baffle 177 may be configured to direct at least a portion of the thermal energy produced by the second heat source 104 to outer portions of the volume adjacent the housing assembly 102. The thermal energy produced by the second heat source 104 may transfer to an upper, first portion of the volume 110. The baffle 177 may be substantially flat as shown in FIG. 1B. The baffle 177 may be sized to be separate from inner surfaces of the housing assembly 102. For instance, there may be some distance between the edges of the baffle 177 and the inner surfaces of the housing assembly 102. Heat from the second heat source 104 may be transferred from the second heat source 104 around the baffle 177 and up to other portions of the volume 110.

The drip tray 179 may be positioned between the baffle 177 and the first heat source 106. The drip tray 179 may be extend along a portion the volume 110. The drip tray 179 is configured to collect fluids dripping from foodstuffs during operation. The fluids may proceed down the drip tray 179 and exit the housing assembly 102 via a funnel 161 (FIG. 1A).

The cooking structure 171, which is introduced above, may include a lattice or web of thermally conductive materials (e.g., metal, ceramic, etc.). The cooking structure 171 in FIGS. 1A and 1B include horizontal and vertical elements that are arranged relative to one another in a plane, which may be referred to as a cooking grid. In other embodiments, the cooking structure 171 may include a solid surface such as a cooking griddle or a substantially solid plane with one or more openings defined therein. The cooking structure 171 may be removable from the housing assembly 102 and/or may be moved farther from or closer to the heat sources 104 and 106. The cooking structure 171 includes a cooking surface configured for placement of foodstuffs.

In the embodiment depicted in FIGS. 1A and 1B, the first heat source 106 includes a low-pressure gas grill or a gas heat source. The gas heat source may be controllable via one or more valves 181, which may be manual valves. The gas heat source may include three burners that extend from a front of the housing assembly 102 to a rear of the housing assembly 102. The three burners may be covered by heat tents, which may distribute heat supplied by the burners and reduce an amount of fluids dripping on the burners. The gas heat source may be positioned in the housing assembly 102 such that thermal energy emitted from the gas heat source is distributed across substantially all of the cooking structure 171 and/or substantially all of the rectangular cross section that is configured to receive the cooking structure 171. The gas heat source is positioned the first distance 131 (FIG. 1B) from the cooking structure 171 in the first direction 108. The first distance 131 may be measured from a top of the heat tents to a bottom of the cooking structure 171. The first distance 131 may be in a range of between about one inch and about six inches. The gas heat source is arranged to heat the cooking structure 171 and an upper portion of the volume 110 via convection. Once heated, the cooking structure 171 may transfer thermal energy via conduction to foodstuffs placed on the cooking surface and may radiate thermal energy. The gas heat source may further supply thermal energy to an upper portion of the volume 110 via convection and radiation. In other embodiments of the cooking device 100, other heat sources may be implemented as the first heat source 106. Additionally or alternatively, the gas heat source may include any number of burners and/or heat tents and may be automatically controlled.

Depiction of the low-pressure gas grill as the first heat source 106 is not meant to be limiting. In some embodiments the first heat source 106 may include another heat source that may be implemented with one or more diffusers. For instance, the first heat source 106 may include an infrared heat source that might include, for example, a gas burner implemented with a ceramic, a stone, or a glass diffuser.

In the embodiments of FIGS. 1A and 1B, the second heat source 104 may include a wood pellet heat source that is configured for combustion of wood pellets. The wood pellet heat source is arranged to produce thermal energy to the housing assembly 102 and thus indirectly to foodstuffs placed on the cooking structure 171. Indirect heating generally indicates that an environment of the foodstuffs is heated, which in turn heats the foodstuffs. Direct heating generally indicates that the thermal energy is applied to a surface of the foodstuffs without necessarily heating an environment first.

The wood pellet heat source is positioned below an interior part of the gas heat source and in the lower portion of the volume 110. The wood pellet heat source is separated from the gas heat source by a particular distance 133 (FIGS. 1B-2B) and separated from the cooking structure 171 by a second distance 135 in the first direction 108. The particular distance 133 may be measured from a bottom surface of the burner to a top of the wood pellet heat source. The particular distance 133 may be between about seven inches and about twenty inches. The second distance 135 may be measured from a top of the wood pellet heat source to a bottom surface of the cooking structure 171. The second distance 135 may be in a range between about nine and about 29 inches. The wood pellet heat source may be positioned in a middle part of the volume 110 and directly below a central burner of the gas heat source. The middle part of the volume 110 may be a central fifty percent (50%), a central forty percent (40%), a central thirty percent (30%), or another central portion of the volume 110. In other embodiments of the cooking device 100, other heat sources may be implemented as the second heat source 104.

The gas heat source may supply a high heat or direct heat to the cooking structure 171 and the volume 110. For instance, the valves 181 may be opened, which increases gas suppled to the gas heat source. As a result, the gas heat source may supply thermal energy at a high temperature (e.g., about 15,000 British thermal units per hour (BTU/H) to about 60,000 BTU/H) to the volume 110 and the cooking structure 171. The gas heat source may accordingly be configured to bring the volume 110 to a particular temperature (e.g., 300 degrees F.) at a first heat rate. The wood pellet heat source may provide thermal energy indirectly to volume 110. However, the wood pellet heat source may operate at a lower temperature than the gas heat source and may be capable of heating the volume 110 to the particular temperature at a second rate, which is less than the first heat rate.

Modifications, additions, or omissions may be made to the cooking device 100 without departing from the scope of the present disclosure. Moreover, the separation of various components in the embodiments described herein is not meant to indicate that the separation occurs in all embodiments. Moreover, it may be understood with the benefit of this disclosure that the described components may generally be integrated together in a single component or separated into multiple components.

Figure 2A:
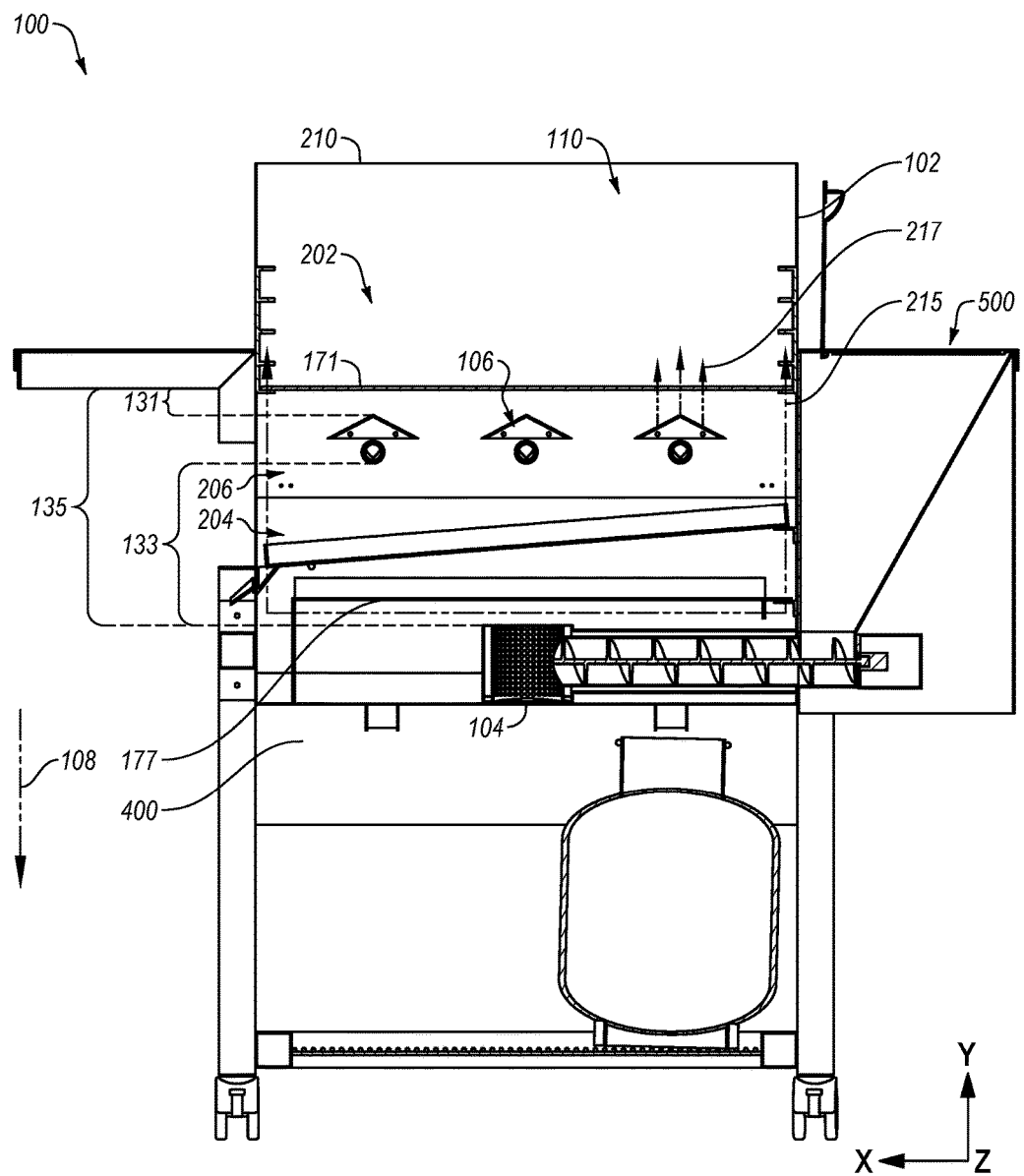
FIG. 2A illustrates a sectional view of the cooking device of FIGS. 1A and 1B.
Figure 2B:
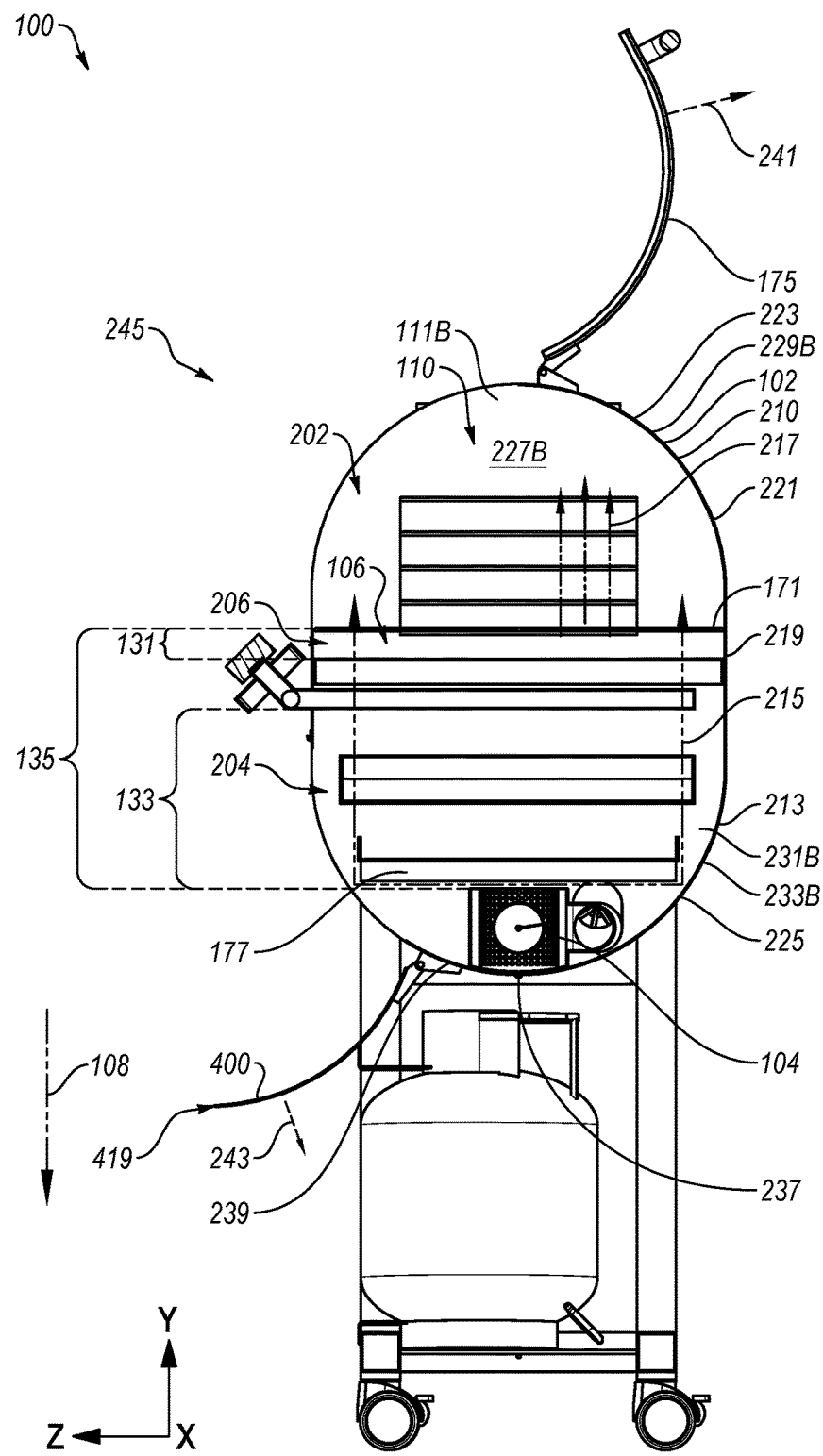
FIG. 2B illustrates another sectional view of the cooking device of FIGS. 1A and 1B.
Figure 2C:
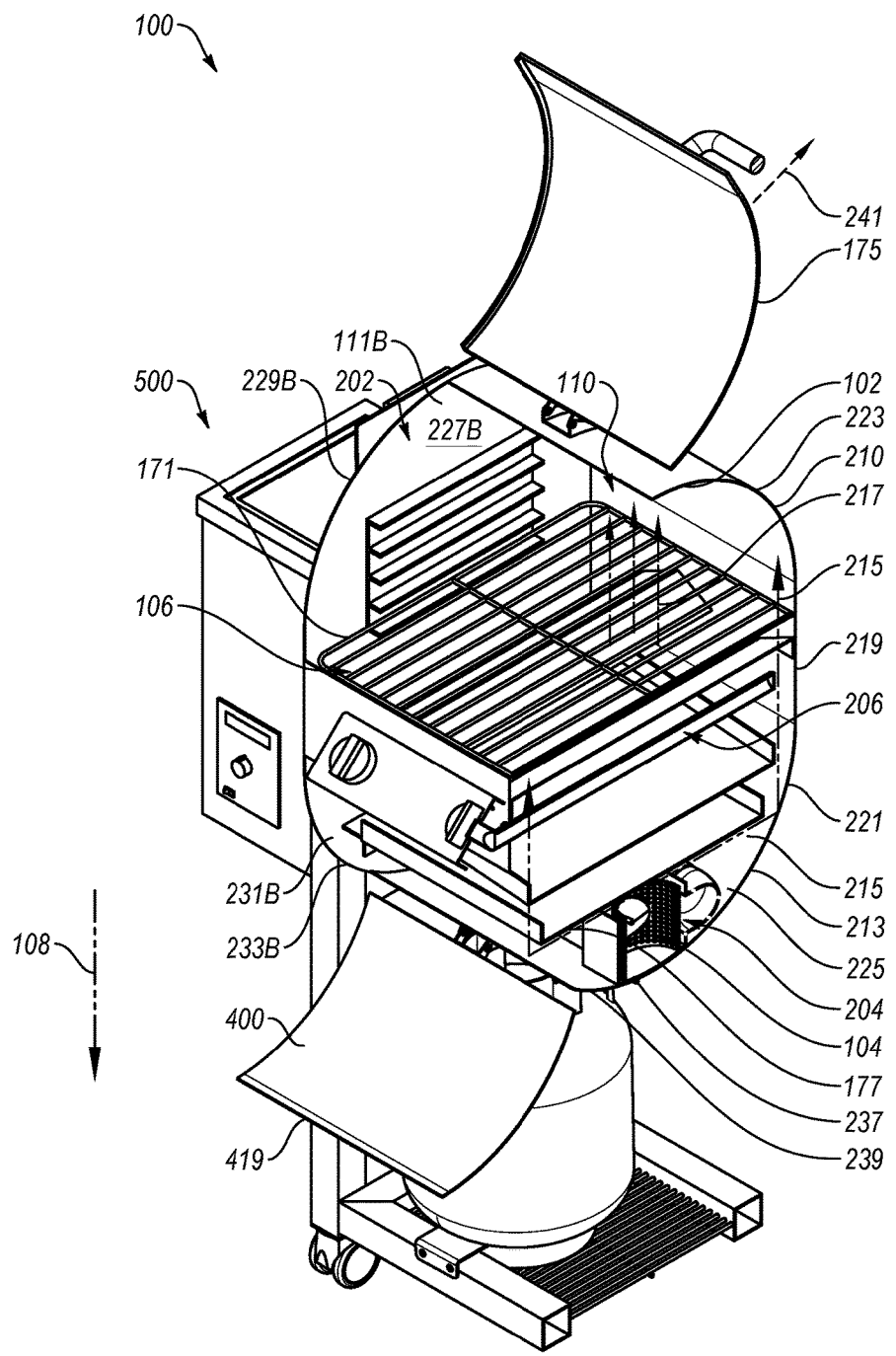
FIG. 2C illustrates another sectional view of the cooking device of FIGS. 1A and 1B.

FIGS. 2A-2C illustrate sectional views of the cooking device 100 of FIGS. 1A and 1B. FIG. 2A depicts a sectional view across a plane that is substantially parallel to the YX plane of FIG. 1A. FIGS. 2B and 2C depict sectional views across a plane that is substantially parallel to the YZ plane. FIGS. 2A-2C depict physical relationships between the first heat source 106 and the second heat source 104 that are disposed in the housing assembly 102.

The housing assembly 102 defines the volume 110. The volume 110 includes a single integrated cooking volume. During use, the volume 110 is heated by the first heat source 106 and/or the second heat source 104, which are both positioned in the single integrated cooking volume. The volume 110 may include a first portion 202, a second portion 204, and a central portion 206. The central portion 206 may be disposed between the first portion 202 and the second portion 204.

The first portion 202 may include an upper portion of the volume 110 that is bordered by an upper arced portion 210 of the housing assembly 102. The first portion 202 may also be selectively bordered by the upper lid 175. For instance, a user may introduce foodstuffs to the housing assembly 102 by lifting the upper lid 175. The cooking structure 171 may be positioned at a lower part of the first portion 202. When the upper lid 175 is in the closed position, the first portion 202 of the volume 110 is substantially enclosed relative to an ambient environment that surrounds the device 100. The first portion 202 includes a part of an environment within the housing assembly 102 around the foodstuffs that are being cooked in the cooking device 100.

The central portion 206 of the volume 110 may include a rectangular cross section 169, which may be defined by a rectangular portion 219. The rectangular cross section 169 may be arranged to receive the cooking structure 171. For instance, the rectangular cross section 169 may substantially correspond to a footprint of the cooking structure 171. The cooking structure 171 may be positioned at an upper end of the central portion 206 and/or a lower portion of the first portion 202. Accordingly, the cooking structure 171 may be positioned between the first portion 202 and the second portion 204 and in the central portion 206.

The second portion 204 may include a lower part or portion of the volume 110. The second portion 204 may be bordered by a lower arched portion 213 of the housing assembly 102. The lower arched portion 213 may extend from the rectangular portion 219 or the rectangular cross section 169. Additionally, the second portion 204 of the volume 110 may be selectively bordered by the lower door 400. For example, the lower door 400 may be transitioned from the open position to the closed position. When the lower door 400 is in the closed position, the second portion 204 may be enclosed or substantially enclosed.

In some embodiments, the first heat source 106 may be disposed in the central portion 206 and the second heat source 104 may be disposed in the second portion 204. The first heat source 106 and the second heat source 104 may be arranged in the stacked arrangement as described elsewhere in the present disclosure. At least a portion of the first heat source 106 is separated from the second heat source 104 in only the first direction 108. For instance, the second heat source 104 may be positioned directly below (e.g., having a lower y-coordinate) the first heat source 106. The second heat source 104 is separated from the first heat source 106 by the particular distance 133 in the first direction 108 as described above. The second heat source 104 may be disposed in the second portion 204 of the volume 110 and may be arranged to provide thermal energy indirectly to the first portion 202 and the central portion 206 of the volume 110. The first heat source 106 may be separated from the cooking structure 171 by the first distance 131. The second heat source 104 may be separated from the cooking structure 171 by the second distance 135. The first and second distances 131 and 135 are defined in the first direction 108. The second distance 135 is greater than the first distance 131.

With reference to FIGS. 2A and 2B, the second heat source 104 may supply a first thermal energy 215 to the housing assembly 102. The first thermal energy 215 may be emitted from the second heat source 104 and be routed around the baffle 177 to the first portion 202 of the volume 110. For instance, the first thermal energy 215 may be directed towards an interior surface of the housing assembly 102. The first thermal energy 215 may be directed from the portions of the volume 110 near the interior surface to the first portion 202. Accordingly, the second heat source 104 may indirectly heat the first portion using the first thermal energy 215.

In addition, the first heat source 106 may supply a second thermal energy 217 to the housing assembly 102. The second thermal energy 217 may be emitted from the first heat source 106 and be routed through the cooking structure 171, heating the cooking structure 171 and the first portion 202 of the volume 110. Accordingly, the first heat source 106 may directly heat the cooking structure 171 and indirectly heat the first portion 202 using the first thermal energy 215.

Figure 3:
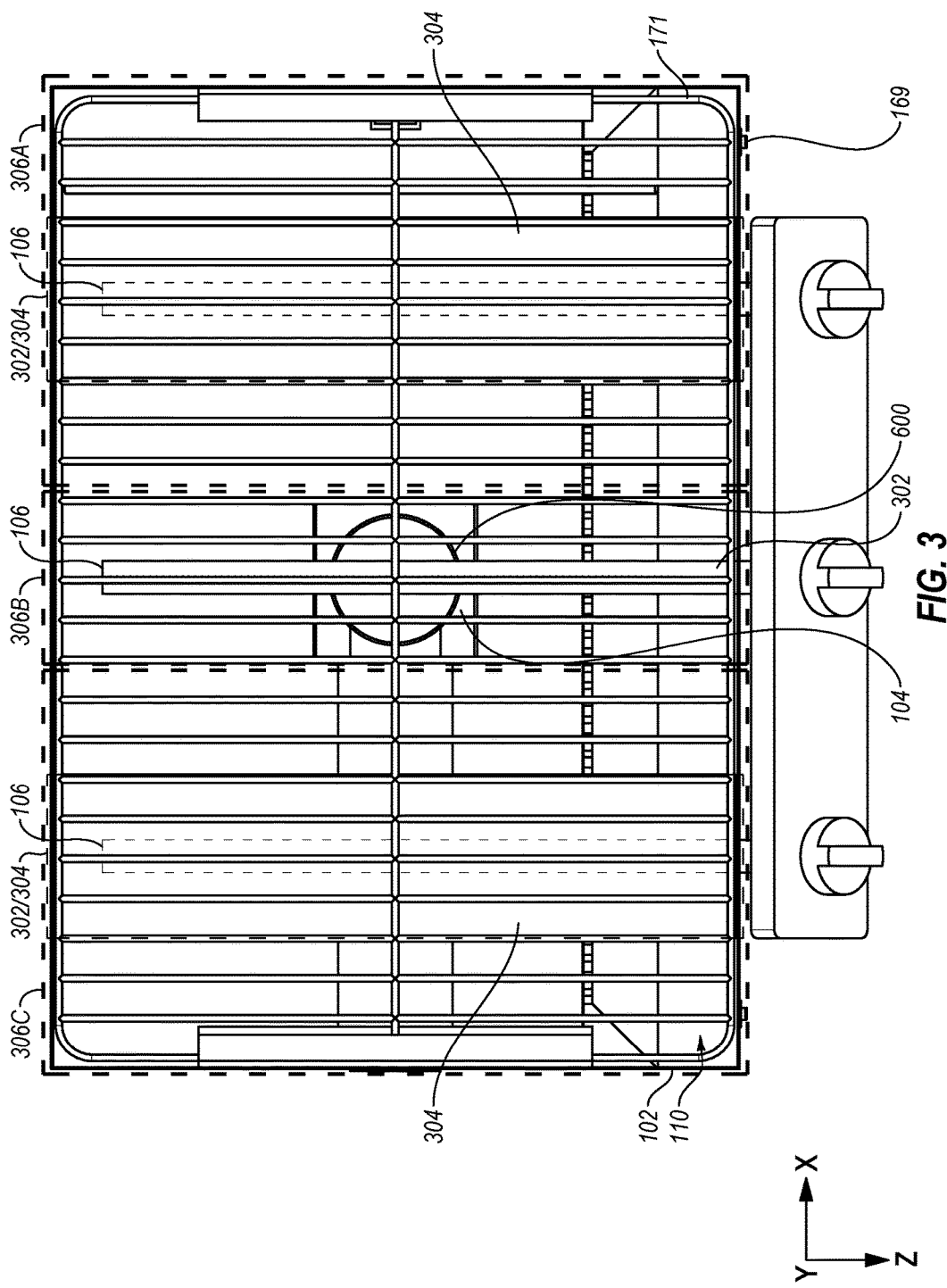
FIG. 3 illustrates a top view of a portion of the cooking device of FIGS. 1A and 1B.

FIG. 3 illustrates a top view of a portion of the cooking device 100 of FIGS. 1A and 1B. In FIG. 3, the upper lid 175, an upper part of the housing assembly 102, the baffle 177, and the drip tray 179 (of FIGS. 1A and 1B) are omitted. The first heat source 106 and the second heat source 104 are depicted below the cooking structure 171. The cooking structure 171 is depicted in the rectangular cross section 169 of the housing assembly 102. The first heat source 106 that is positioned in the housing assembly 102 such that thermal energy (e.g., 217 of FIGS. 2A and 2B) emitted from the first heat source 106 is distributed across substantially all of the rectangular cross section 169. For instance, in the embodiment of FIG. 3, the first heat source 106 includes a gas heat source. The gas heat source includes three burners 302 (one burner 302 is shown and labelled in FIG. 3 as 302). The three burners 302 may be covered by heat tents 304 (two heat tents 304 are shown and labelled in FIG. 3 as 304). The burners 302 and the heat tents 304 may be positioned relative to the cooking structure 171 such that thermal energy provided by the first heat source 106 is distributed to substantially all of the cooking structure 171. For instance, a first burner/heat tent combination 302/304 may provide direct heat to a first portion 306A of the cooking structure 171, the burner 302 (which may be implemented with a heat tent) may direct heat to a second portion 306B of the cooking structure 171, and a third burner/heat tent combination 302/304 may provide direct heat to a third portion 306C of the cooking structure 171. The first portion 306A, the second portion 306B, and the third portion 306C may overlap. Accordingly, the first heat source 106 may provide the direct heat over substantially all of the cooking structure 171 and the direct heat may be distributed across substantially all of the rectangular cross section 169.

The second heat source 104 may be disposed at least partially in the housing assembly 102 with the first heat source 106. For instance, in the depicted embodiment, the second heat source 104 may be disposed below (disposed from the first heat source 106 in the negative y-direction) the first heat source 106 and in a middle part of volume 110 defined by the housing assembly 102. In these and other embodiments, at least a portion of the first heat source 106 is separated from the second heat source 104 in only a first direction (108 of FIGS. 1A-2C) that is substantially parallel to the y-direction.

The second heat source 104 may provide thermal energy (e.g., 215 of FIGS. 2A and 2B) indirectly to the housing assembly 102. The thermal energy provided by the second heat source 104 may be emitted and be routed around a baffle (omitted in FIG. 3), which may indirectly heat the volume 110 and the cooking structure 171.

In the embodiment of FIG. 3, the second heat source 104 is positioned and disposed such that the first heat source 106 is capable of directly heating substantially all of the cooking structure 171. For example, the second heat source 104 is below (displaced in the y-direction) the first heat source 106. Thus, the second heat source 104 does not interrupt transfer of the direct heat to the cooking structure 171. Instead, the second heat source 104 may provide the indirect heat that may be distributed around the first heat source 106.

Additionally, in the embodiment of FIG. 3, a wood pellet burner 600 may be positioned in a center of the housing assembly 102. In other embodiments, the wood pellet burner 600 or another portion of the second heat source 104 may not be positioned in the center of the housing assembly 102. For instance, the portion of the second heat source 104 may be disposed in an interior part, which may include a central portion (e.g., central fifty percent) of the cooking structure 171.

Figure 4A:
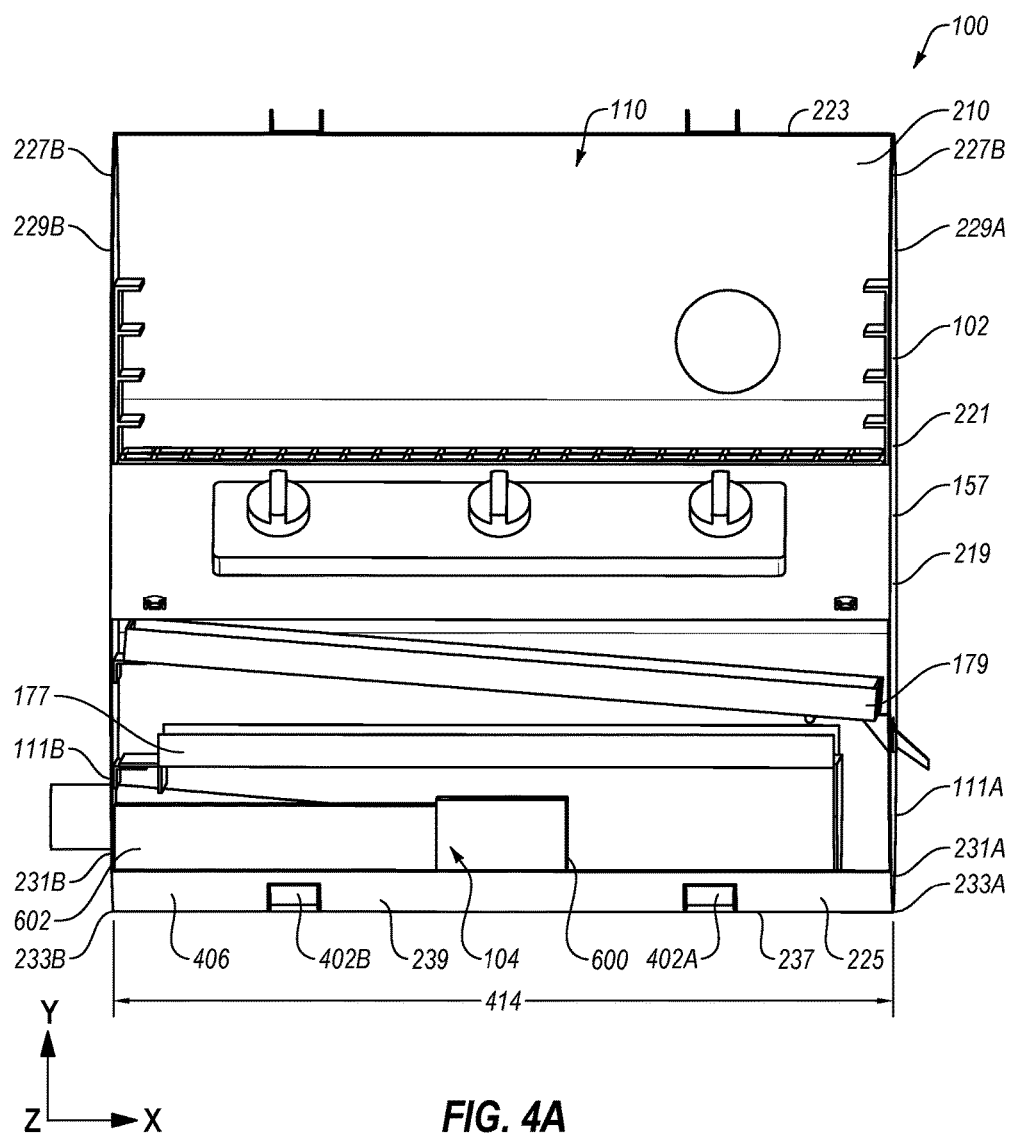
FIG. 4A illustrates a detailed view of a portion of the cooking device with an exemplary lower door in an open position.
Figure 4B:
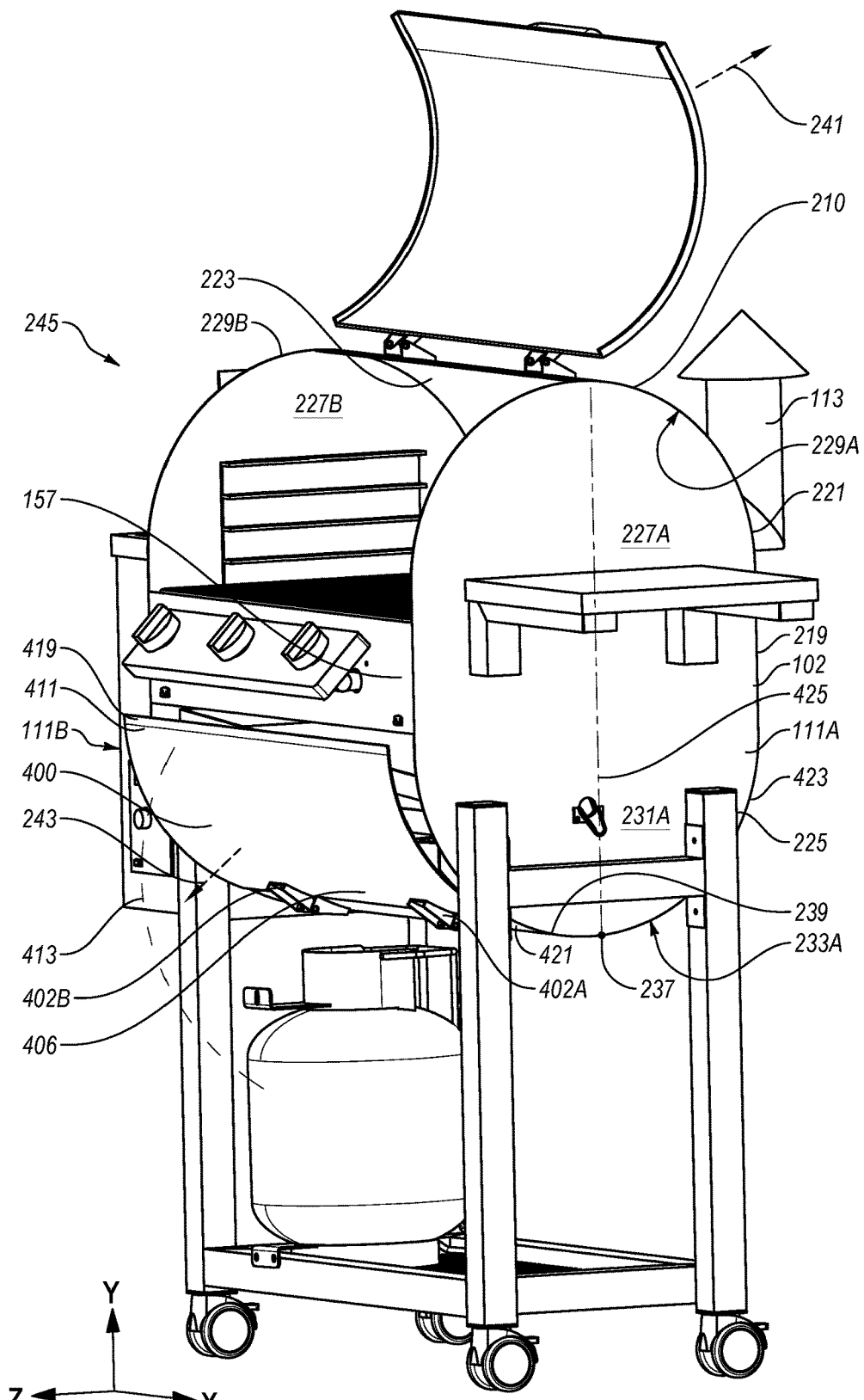
FIG. 4B illustrates the cooking device with the lower door in a closed position.
Figure 4C:
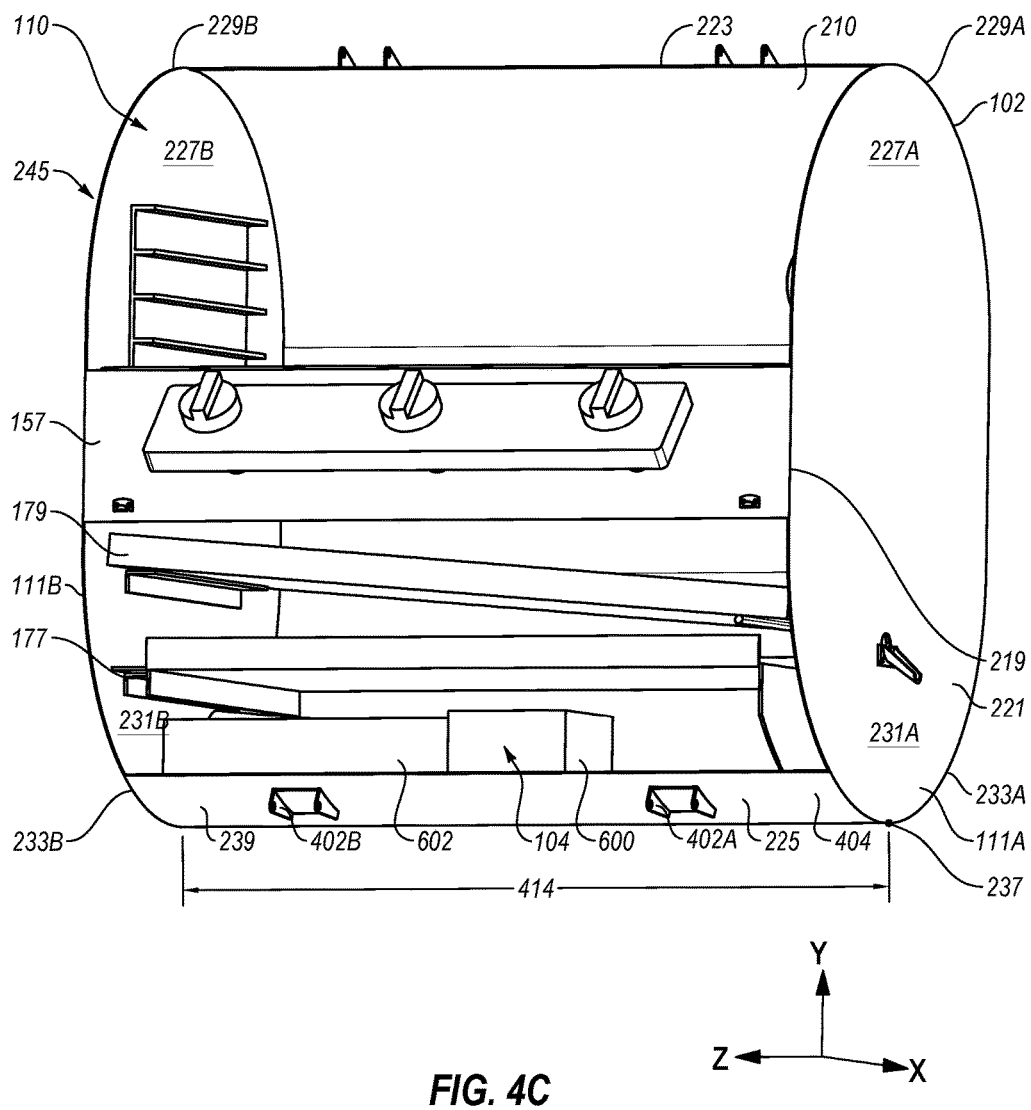
FIG. 4C illustrates a detailed view of a portion of the cooking device with the lower door in the closed position.
Figure 4D:
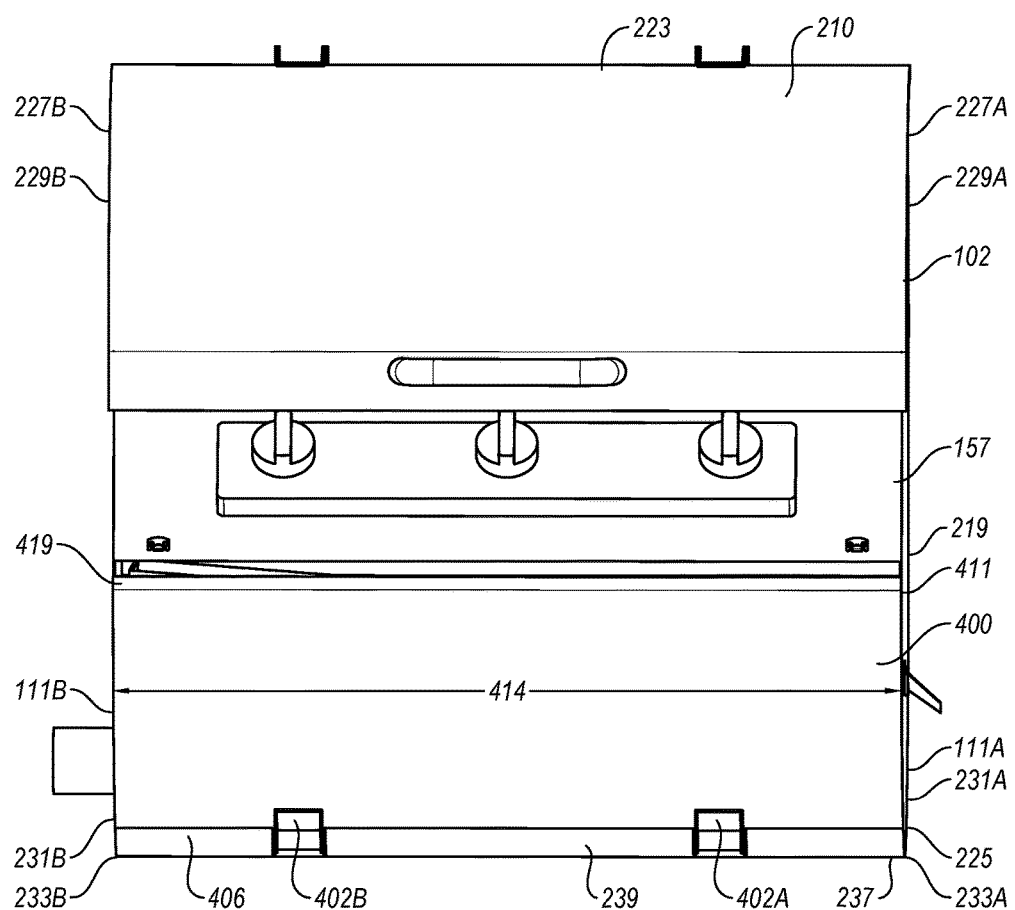
FIG. 4D illustrates a detailed view of a portion of the cooking device with the lower door removed.

FIGS. 4A-4D illustrates detailed views of an exemplary embodiment of the housing assembly 102 that includes an exemplary embodiment of the lower door 400. FIG. 4A illustrates the housing assembly 102 with the lower door 400 in the open position. FIG. 4B illustrates the housing assembly 102 with the lower door 400 in the closed position. FIG. 4C illustrates the housing assembly 102 with the lower door 400 removed. FIG. 4D illustrates the housing assembly 102 with the lower door 400 in the closed position.

With combined reference to FIGS. 2B, 2C and 4A-4D, the lower door 400 may be implemented to provide access to at least portions of components of the cooking device 100 such as portions of a wood pellet burner 600 or another second heat source 104, the baffle 177, the auger conduit 602, the drip tray 179, an internal surface of the housing assembly 102, or some combination thereof. With the lower door 400 open, a user may clean or otherwise maintain these components. For instance, during operation of the cooking device 100, these components may become dirty. For example, following use of a pellet burner, soot, combustion by-products, foodstuff by-products, etc. may become deposited on the components of cooking device 100. When the components become dirty, efficiency of the cooking device 100 may decline. For instance, the soot and the combustion by-products may insulate surfaces, which may change the thermal transfer characteristics of the components. Additionally, when the components become dirty, the components may become unsanitary. For instance, contaminants such as bacteria and mold may grow on foodstuff by-products between uses of the cooking device. Additionally still, contaminants deposited on the components may reduce the life of the components due to increases in corrosion rates of the components. Accordingly, the lower door 400, which may enable access to the components, which facilitates cleaning of the components. Removal of the contaminants may increase or maintain the efficiency of the components, keep the components sanitary, and increase the life of the components.

The housing assembly 102 of FIGS. 4A-4D may include a fixed housing portion 221. The fixed housing portion 221 may be substantially stationary during use of a device (e.g., the device 100) implementing the housing assembly 102. The upper lid 175 and the lower door 400 may be configured to move relative to the fixed housing portion 221. In addition, the fixed housing portion 221 may include a fixed upper portion 223 that includes the upper arched portion 210 and a fixed bottom portion 225 that includes the lower arched portion 213. Additionally, a first side 111A, a second side 111B, and a rectangular portion 219 may be included in the fixed housing portion 221.

The first side 111A and the second side 111B may be substantially similar. The first side 111A may include a first upper arced planar portion 227A. A first upper curved edge 229A may extend along at least a portion of the first upper arced planar portion 227A. In addition, the first side 111A may include a first lower arced planar portion 231A. A first lower curved edge 233A may extends along at least a portion of the first lower arced planar portion 231A. Similarly, the second side 111B may include a second upper arced planar portion 227B. A second upper curved edge 229B may extend along at least a portion of the second upper arced planar portion 227B. In addition, the second side 111B may include a second lower arced planar portion 231B. A second lower curved edge 233B may extends along at least a portion of the second lower arced planar portion 231B.

The fixed upper portion 223 may be coupled to the first side 111A along at least a portion of the first upper curved edge 229A and to the second side 111B along at least a portion of the second upper curved edge 229B. For instance, the fixed upper portion 223 may be welded or otherwise mechanically coupled to the first side 11A and the second side 111B. A coupling between the fixed upper portion 223 and the first side 11A and the second side 111B may substantially seal the first portion 202 of the volume 110.

The upper lid 175 may be rotatably coupled to the fixed upper portion 223. The upper lid 175 may be coupled to fixed upper portion 223 via one or more hinges as shown in FIGS. 4A-4D. The upper lid 175 is positionable in a closed position and in an open position relative to the fixed housing portion 221. In the open position, a user may access the cooking structure 171 and/or foodstuffs placed on the cooking structure 171. In the closed position, the first portion 202 of the volume 110 may be substantially sealed relative to an environment surrounding the housing assembly 102. FIG. 4D depicts the upper lid 175 is the closed position. FIG. 4B depicts the upper lid 175 is the open position. To transition between the closed position and the open position, the upper lid 175 may rotate in a first angular direction. The first angular direction is represented by arrow 241.

The fixed bottom portion 225 may be coupled to the first side 111A along the first lower curved edge 233A and to the second side 111B along the second lower curved edge 233B. The fixed bottom portion 225 includes a lowermost point 237. The lowermost point 237 may include a part of the fixed bottom portion 225 including the lowest y-coordinate. The fixed bottom portion 225 may also include a upwardly curved surface 239. The upwardly curved surface 239 may extend from the lowermost point 237 in a direction towards the fixed upper portion 223. For example, the upwardly curved surface 239 may extend in the z direction and in the y direction from the lowermost point 237. The lower door 400 may be coupled to the upwardly curved surface 239.

For instance, the lower door 400 may be rotatably coupled to the upwardly curved surface 239 via hinges 402A and 402B. In the depicted embodiment, the lower hinges 402 may rotatably connect the lower door 400 to the housing assembly 102. A leaf of the lower hinges 402 of the embodiment of FIGS. 4A-4D may be positioned on a bottom portion 404 of the housing assembly 102. For instance, the leaf of the lower hinges 402 may be positioned on an outer curved surface of the housing assembly 102. Another leaf of the lower hinges 402 may be connected to a lower door portion 406 of the lower door 400. The lower door 400 may rotate about the lower hinge 402 from the open position to the closed position. The open position of the lower door 400 is depicted in FIG. 4A as well as FIGS. 1A and 1B described above. The closed position of the lower door 400 is depicted in FIGS. 4B and 4D.

The upwardly curved surface 239 may provide a volume at the bottom of the housing assembly 102. Ash and other contaminants may accumulate in the volume at the bottom of the housing assembly 102. Accordingly, when a user opens the lower door 400 the ash or other contaminants may not drop to a surface on which the device 100 is placed.

In some embodiments, the lower door 400 may be coupled to another portion of the housing assembly 102. For instance, the lower door 400 may be coupled to one or both of the sides 111A and 111B. Alternatively, the lower door 400 may be coupled to the rectangular portion 219.

The lower door 400 may be positioned in a closed position (as shown in FIGS. 4B and 4D) and in an open position (as shown in FIGS. 2B and 2C). In the closed positions, the lower door 400 may substantially seal the lower portion 204 of the volume 110 relative to the environment surrounding the cooking device. In the open position a subset of the device components (e.g., 104, 600, 177, and 179) is accessible.

As discussed above, in the open position, the components (e.g., the wood pellet burner 600, the baffle 177, the auger conduit 602, the drip tray 179, the auger conduit 602, an internal surface of the housing assembly 102, etc.) may be accessible such that these components may be cleaned or otherwise maintained. In the closed position, the second portion 204 of the volume 110 may be enclosed and/or substantially sealed. Accordingly, the thermal energy provided by the wood pellet burner 600 of the second heat source 104 may be contained or substantially contained in the housing assembly 102. Additionally, access to the components may be prevented such that users may not be exposed to hot components.

The lower door 400 may make up a substantial portion of a front, arced portion of the housing assembly 102. For example, the lower door 400 may extends an entirety of a distance 414 between the first side 111A and the second side 111B. Additionally, in some embodiments, the lower door 400 may extend from the rectangular portion 219 to the upwardly curved surface 239. In other embodiments, the lower door 400 may make up another portion of the housing assembly 102. For instance, the lower door 400 may extend a part of the distance 414 between the first side 111A and the second side 111B.

The lower door 400 may include an upper door portion 411 and a lower door portion 406. The upper door portion may include a free edge 419. The free edge 419 of the lower door 400 is positioned adjacent to or contacts the rectangular portion 219 when the lower door 400 is positioned in the closed position.

With reference to FIG. 4B, the lower door 400 of FIGS. 4A-4D may be configured to rotate such that the upper door portion 411 of the lower door 400 moves along a curved path 413 as it transitions between the open position and the closed position. The curve path 413 includes a movement in a negative y-direction and extends down and away from the housing assembly 102. In the open position, the lower door 400 swings down and away from the housing assembly 102 and hangs from the lower door portion 406 that is coupled to the bottom portion 404 of the housing assembly 102. The curved path 413 represents a rotation of the lower door 400 in a second angular direction. The second angular direction is represented by arrow 243.

In the depicted embodiment, the upper lid 175 and the lower door 400 may be positioned on the same side of the cooking device 100. For instance, the upper lid 175 and the lower door 400 may be positioned on a front of the cooking device 100. In these and other embodiments, the second angular direction 241 is substantially opposite the first angular direction 243.

In some embodiments, the lower door 400 may be arced or may include one or more arced sections. For instance, the lower door 400 may include an arced structure that extends from the rectangular portion 219 of the housing assembly 102 to the bottom portion 404 of the housing assembly 102.

The arc of the lower door 400 may be related to curves or structures of the fixed bottom portion 225. For instance, the fixed bottom portion 225 includes a rear portion that includes lower, rear curve. The lower, rear curve be similar to the lower curved edges 233A and 233B of the sides 111A and 111B. The lower door 400 may include a front, arced portion that is substantially similar to the lower rear curve of the fixed bottom portion 225. Additionally, the lower door 400 may makes up a substantial portion of a lower portion of the front 245 of the housing assembly 102. Accordingly, the housing assembly 102 may be symmetric about a longitudinal axis 425 that bisects the housing assembly 102 through the lowermost point 237. The longitudinal axis 425 may define a plane that is substantially parallel to the YX plane of FIG. 4B.

In the depicted embodiment, the housing assembly 102 includes the rectangular portion 219 that connects the fixed upper portion 223 and the fixed bottom portion 225. In these and other embodiments, when the lower door 400 is in the closed position, the upper door portion 411 or the free edge 419 may be disposed substantially adjacent to the rectangular portion 219. In the open position, the lower door 400 is rotated about the fixed bottom portion 225 such that the upper door portion 411 is separated from the rectangular portion 219.

One or more components of the housing assembly 102 may be implemented in cooking devices that do not multiple heat sources in a stacked configuration. For instance, the lower door 400 may be implemented in cooking devices that include the second heat source 104 and omits the first heat source 106. In these embodiments, the housing assembly 102 may omit the rectangular portion 219 or a dimension of the rectangular portion 219 in the y-direction may be reduced relative to the depicted embodiments. In these and other embodiments, the fixed upper portion 223 may be positioned adjacent to the fixed bottom portion 225. Accordingly, when the lower door 400 is in the closed position, the upper door portion 411 or the free edge 419 may be disposed substantially adjacent to the fixed upper portion 223 or to an edge of the upper lid 175 (e.g., when the upper lid 175 is in the closed position). In the open position, the lower door 400 is rotated about the fixed bottom portion 225 such that the upper door portion 411 is separated from the fixed upper portion 223 or to an edge of the upper lid 175.

Figure 5A:
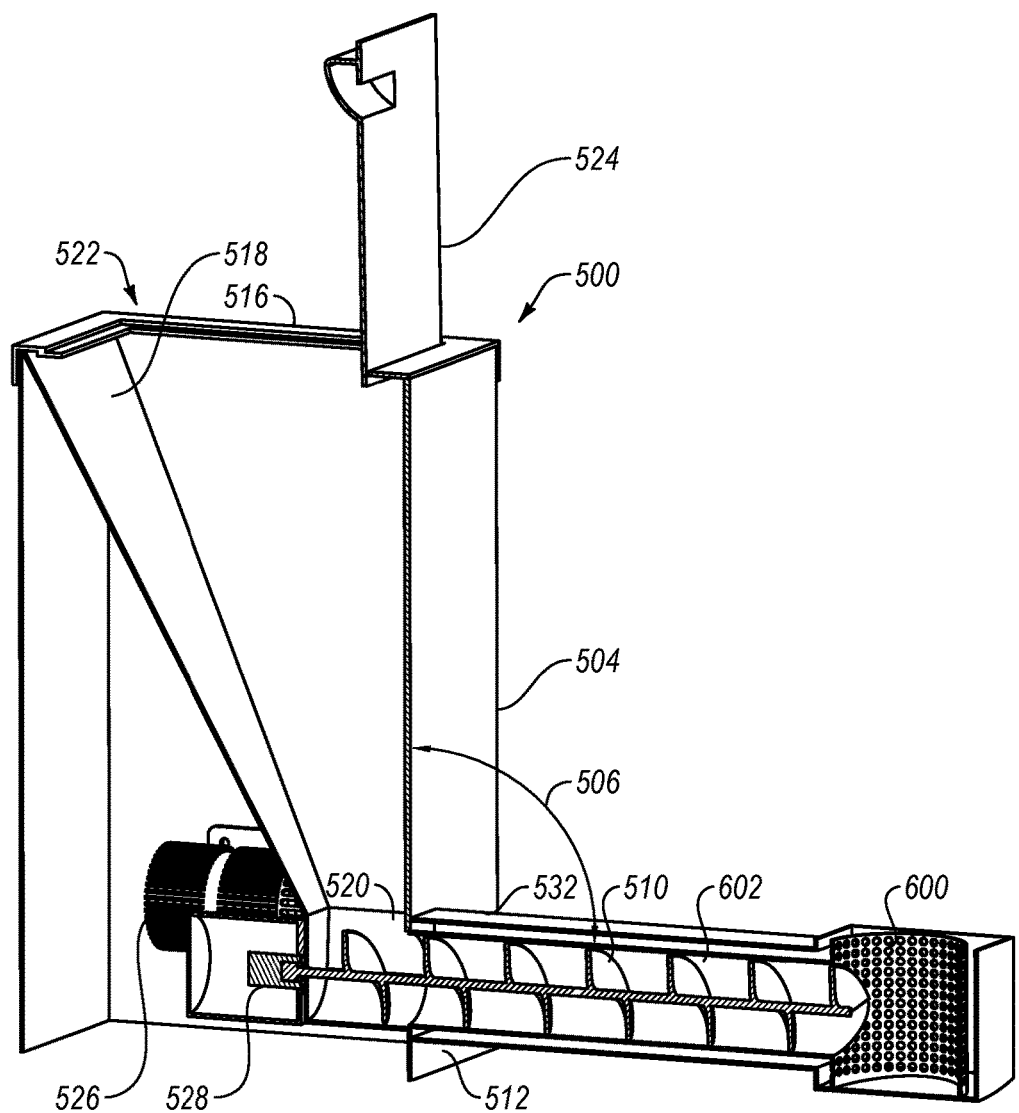
FIG. 5A illustrates an exemplary feed subsystem that may be implemented in the cooking device of FIGS. 1A and 1B.
Figure 5B:
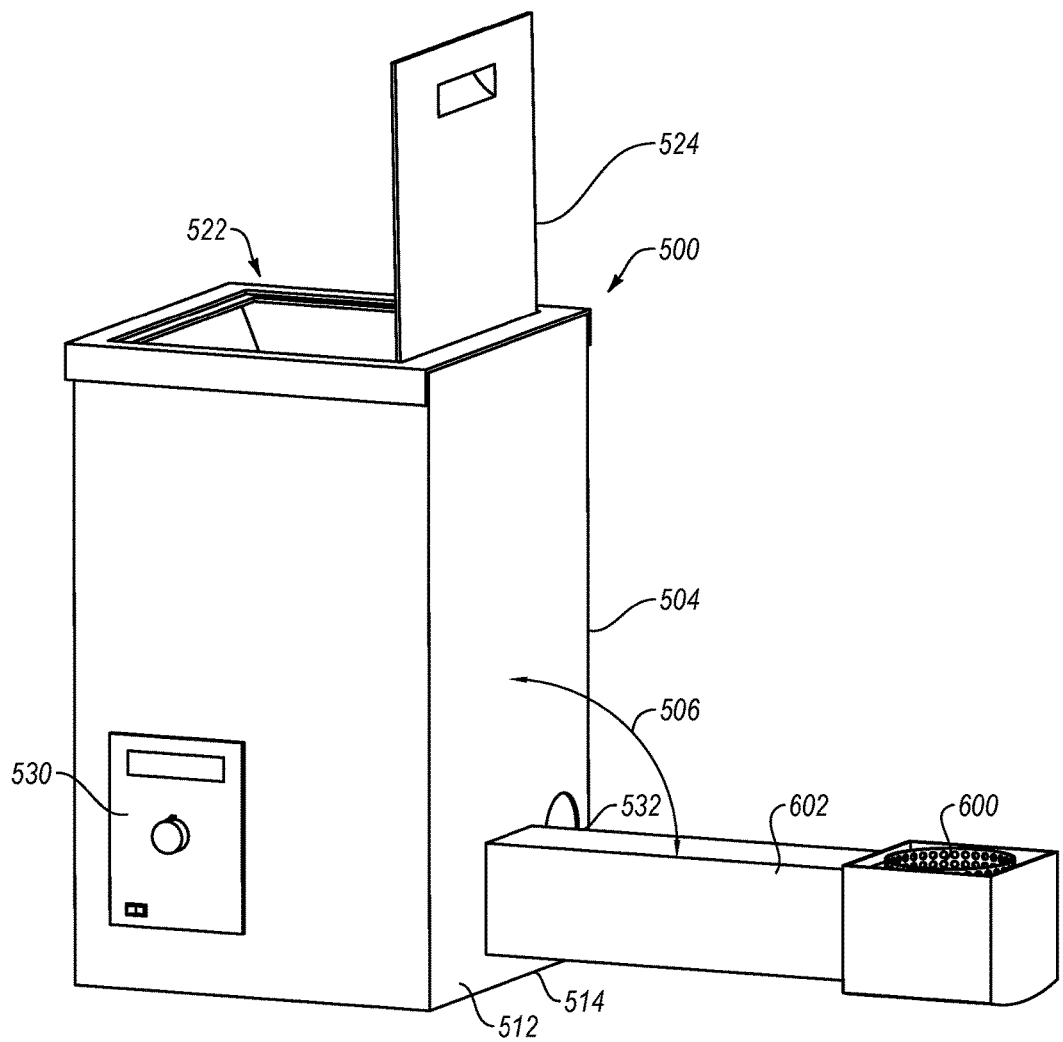
FIG. 5B illustrates a sectional view of the feed subsystem of FIG. 5A, all in accordance with at least one embodiment described in the present disclosure.

FIGS. 5A and 5B illustrate an exemplary embodiment of a feed subsystem 500 that may be implemented in the cooking device 100 of FIGS. 1A and 1B. FIG. 5A depicts an outer or an external view of the feed subsystem 500. FIG. 5B depicts a sectional view of the feed subsystem 500. The feed subsystem 500 may be configured to feed wood pellets to the wood pellet burner 600. For instance, in the depicted embodiment, the feed subsystem 500 may be an auger-driven feed subsystem 500. In the auger-driven feed subsystem 500, an auger 510 (FIG. 5B) may be positioned in a lower portion of the wood pellet reservoir 504. The auger 510 may be positioned in an auger conduit 602 coupled to the wood pellet reservoir 504. As the auger 510 rotates, the wood pellets may be transferred from the wood pellet reservoir 504 to the wood pellet burner 600 via the auger conduit 602.

Although the feed subsystem 500 of FIGS. 5A and 5B includes an auger-driven feed subsystem 500, in other embodiments the feed subsystem 500 may include another type of feed subsystem. For instance, the feed subsystem 500 may include a gravity-feed system, a belt-feed system, a vacuum system, a vertical auger-driven system, combinations thereof, or another suitable feed subsystem 500.

Referring to FIG. 5A, the wood pellet reservoir 504 of the feed subsystem 500 may be mechanically coupled to a housing assembly of a cooking device. The position of the wood pellet reservoir 504 relative to the housing assembly may be related to the position of the auger conduit 602 on the wood pellet reservoir 504. For instance, with combined reference to FIGS. 5A and 1A, the wood pellet reservoir 504 may be mechanically coupled to or positioned adjacent to a side (e.g., 111A or 111B) of the housing assembly 102 of the cooking device 100. In these and other embodiments, the auger conduit 602 may extend from a lower portion 512 of the wood pellet reservoir 504. For instance, the lower portion 512 may be between about one and about two inches from a bottom edge 514 of the wood pellet reservoir 504. Additionally, the auger conduit 602 may extend from the wood pellet reservoir 504 at an angle 506. The angle 506 may be about 90 degrees. With the auger conduit 602 extending from the lower portion 512 and the auger conduit 602 extending at the angle 506, the wood pellet burner 600 may be positioned in the lower portion of the volume 110 defined by the housing assembly 102.

In other embodiments, the wood pellet reservoir 504 may be mechanically coupled to another portion of a housing assembly. For instance, the wood pellet reservoir 504 may be mechanically coupled to a rear portion of a housing assembly or a bottom portion of the housing assembly. In these embodiments, the auger conduit 602 may extend from another part of the wood pellet reservoir 504. Additionally, the angle 506 may be less than 90 degrees or greater than 90 degrees such that the wood pellet burner 600 is positioned in the lower portion of a cooking volume (e.g., the lower portion of the volume 110 of FIGS. 1A and 1B).

With reference to FIG. 5B, the wood pellet reservoir 504 may include a shoot 516. The shoot 516 may include a sloped surface 518 that directs wood pellets to an initial portion 520 of the auger 510. The wood pellets may be loaded into the shoot 516 via a reservoir opening 522 and may be directed to the initial portion as the auger 510 rotates in the auger conduit 602. A reservoir door 524 may be included on the wood pellet reservoir 504. The reservoir door 524 may be selectively positioned to cover or enable access to the shoot 516.

The wood pellet reservoir 504 may house a blower 526. The blower 526 may include an axial fan or another suitable fan that provides air to the wood pellet burner 600. For example, the blower may force air out a blower opening 532 and to a second burner opening 618 of the wood pellet burner 600. The air may be consumed during combustion of wood pellets in the wood pellet burner 600.

In some embodiments, the wood pellet reservoir 504 may also house a controller 530. The controller 530 may enable input of control settings such as a temperature (e.g., 225 Fahrenheit (F)), an operating level (e.g., high, low, medium), or a function (e.g., heat, smoke, warm). The controller 530 may control the feed subsystem 500. For instance, the controller 530 may control the operation of the blower 526, a rotational speed of the auger 510, a temperature in the wood pellet burner 600, or some combination thereof. In some embodiments, the cooking device implementing feed subsystem 500 may include a thermocouple or another suitable temperature measurement device. The thermocouple may be electrically coupled to the controller 530. The controller 530 may automatically control the blower 526 and/or the auger 510 to maintain a measured temperature in the cooking device. Accordingly, the wood pellets may be automatically fed into the wood pellet burner 600 using the controller 530.

The wood pellet burner 600 may be configured to receive wood pellets and contain the wood pellets as they combust. Combustion of the wood pellets provides thermal energy to the cooking device. Additionally, in some embodiments, the combustion of the wood pellets may provide smoke that is used to flavor and to cook foodstuffs placed in the cooking device. The wood pellet burner 600 may be implemented with the feed subsystem 500. For instance, the wood pellet burner 600 may be coupled to the auger conduit 602. The auger conduit 602 may be coupled to a bottom portion of the reservoir 502. Wood pellets may travel along the auger conduit 602 and enter the wood pellet burner 600. The wood pellet burner 600 may be fluidly coupled to the blower 526, which may provide air for combustion of the wood pellets.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A cooking device, comprising:
    a housing assembly that defines a single integrated cooking volume including two or more portions;
    a cooking structure having a cooking surface that is arranged for placement of a foodstuff, the cooking surface being disposed at a boundary between two of the portions;
    a gas heat source positioned in the integrated cooking volume, the gas heat source including two or more burners, positioned a first distance from the cooking structure in a first direction, each of the two or more burners heating one portion of two or more overlapping portions of the cooking structure such that the first heat source is distributed across the cooking structure and arranged to directly heat all of the cooking structure and to heat the cooking volume; and a wood pellet heat source positioned in a central portion of the integrated cooking volume directly below the gas heat source such that the wood pellet heat source is disposed a second distance from the cooking structure in only the first direction, the second distance being greater than the first distance such the gas heat source and the wood pellet heat source are in a stacked configuration, the wood pellet heat source being arranged to provide thermal energy indirectly to the cooking volume.

2. The cooking device of claim 1, wherein:
the two or more portions include a first portion, a second portion, and a central portion that is disposed between the first portion and the second portion;
the gas heat source is disposed in the central portion of the cooking volume; and
the wood pellet heat source is disposed in the second portion of the cooking volume.

3. The cooking device of claim 1, further comprising:
a baffle that is disposed between the gas heat source and the wood pellet heat source, the baffle being configured to direct at least a portion of the thermal energy produced by the wood pellet heat source to outer portions of the cooking volume adjacent the housing assembly and to the first portion of the cooking volume; and
a vent conduit,
wherein:
the housing assembly defines a vent opening that connects the vent conduit to the first portion of the cooking volume; and
the vent conduit connects the first portion of the cooking volume to an ambient environment.

4. The cooking device of claim 1, wherein:
the gas heat source is arranged to heat the cooking structure at least partially via convection such that the cooking structure provides thermal energy at least partially via conduction to the foodstuff placed on the cooking surface; and
the wood pellet heat source is arranged to heat the cooking volume at least partially via convection.

5. The cooking device of claim 1, wherein the gas heat source and the wood pellet heat source are usable independently and usable concurrently such that the housing assembly is heatable by the gas heat source, the wood pellet heat source, or a combination of the gas heat source and the wood pellet heat source.

6. The cooking device of claim 1, wherein:
the gas heat source includes a low pressure gas grill that is controllable via a valve; and
the wood pellet heat source includes a wood pellet burner that is fed via an automatic pellet feed subsystem.

7. The cooking device of claim 6, further comprising a wood pellet reservoir that is mechanically coupled to the housing assembly,
wherein:
the wood pellet burner includes a cylindrical structure configured to receive wood pellets from the wood pellet reservoir via an auger; and
the auger is positioned at a lower portion of the wood pellet reservoir.

8. The cooking device of claim 1, wherein the housing assembly includes a rectangular cross section, a lower arched portion below the rectangular cross section, and an upper arched portion above the rectangular cross section.

9. The cooking device of claim 1, further comprising:
a baffle that is sized to be separate from inner surfaces of the housing assembly such that heat from the wood pellet heat source may be transferred from the wood pellet heat source around the baffle and towards an upper portion of the integrated cooking volume; and
a drip tray configured to collect fluids dripping from foodstuffs, the drip tray being angled relative to the baffle such that the fluids proceed down the drip tray and exit the housing assembly via a funnel,
wherein the baffle and the drip tray are positioned between the gas heat source and the wood pellet heat sources.

10. A cooking device having a stacked arrangement, the cooking device comprising:
a housing assembly that defines a single integrated volume that includes a rectangular cross section, a lower portion and a central portion that is above the lower portion;
a rectangular cooking structure having a cooking surface configured for placement of foodstuffs, the cooking structure being disposed in the central portion of the volume;
a gas heat source that is positioned in the lower portion of the integrated volume and disposed a first distance below the rectangular cooking structure, the gas heat source including two or more burners arranged relative to the cooking structure such that the gas heat source is below all of the rectangular cooking structure and directly heats all of the cooking structure; and
a wood pellet heat source that is positioned directly below one of the two or more burners of the gas heat source and in an interior part in the lower portion of the integrated volume, the wood pellet heat source being arranged to provide thermal energy indirectly to the cooking volume.

11. The cooking device of claim 10, wherein:
the lower portion of the volume is defined by an arced lower portion of the housing assembly and includes a substantially rectangular cross-section at an upper end that substantially corresponds to a footprint of the cooking structure; and
the volume further comprises an upper portion that includes an arc boundary defined at least partially by an upper lid that is rotatably connected to the housing assembly.

12. The cooking device of claim 11, further comprising a wood pellet reservoir that is mechanically coupled to the housing assembly, wherein:
the wood pellet heat source is fed via an automatic pellet feed subsystem;
the wood pellet heat source includes a cylindrical structure configured to receive wood pellets from the wood pellet reservoir via an auger; and
the auger is positioned at a lower portion of the wood pellet reservoir.

13. The cooking device of claim 12, wherein:
the gas heat source is controllable via a valve;
the gas heat source and the wood pellet heat source are usable independently and usable concurrently; and
the gas heat source is configurable to bring the upper portion of the volume to a particular temperature at a first rate that is greater than a second rate at which the wood pellet heat source is capable of heating the upper portion of the volume to the particular temperature.

14. The cooking device of claim 13, further comprising a lower door that provides access to the lower portion of the volume,
wherein:
the lower door is rotatably coupled to the housing assembly at a lower housing end;
the lower door is configurable in an open position in which the wood pellet heat source is accessible; and
the lower door is configurable in a closed position in which the volume is substantially sealed relative to an ambient environment.

15. A cooking device, comprising:
a housing assembly that defines a single integrated cooking volume that includes a rectangular cross section that is arranged to receive a cooking structure, a lower arched portion below the rectangular cross section, and an upper arched portion above the rectangular cross section;
a gas heat source that is positioned in the integrated cooking volume of the housing assembly, the gas heat source including two or more burners each heating one portion of two or more overlapping portions of the cooking structure such that a first thermal energy emitted from the two or more burners is distributed across all of the rectangular cross section; and
a wood pellet heat source positioned in a central portion of the integrated cooking volume and disposed directly below one of the two or more burners of the gas heat source, the wood pellet heat source being arranged to provide a second thermal energy indirectly to the housing assembly.

16. The cooking device of claim 15, wherein:
the wood pellet heat source is separated from the gas heat source by a first distance in only a first direction; and
the gas heat source and the wood pellet heat source are usable independently and usable concurrently.

17. The cooking device of claim 16, further comprising a pellet feed subsystem that includes a wood pellet reservoir mechanically coupled to the housing assembly and an auger that is positioned at a lower portion of the wood pellet reservoir,
wherein:
the gas heat source includes a low pressure gas grill that is controllable via one or more valves;
the wood pellet heat source includes a wood pellet burner that is configured to receive wood pellets from the wood pellet reservoir via the auger; and
the wood pellet burner includes a cylindrical structure.

* * * * *